United States Patent
Cox

(10) Patent No.: US 9,646,390 B2
(45) Date of Patent: May 9, 2017

(54) PARALLEL IMAGE COMPRESSION

(71) Applicant: CANON KABUSHIKI KAISHA, Tokyo (JP)

(72) Inventor: Philip John Cox, West Pennant Hills (AU)

(73) Assignee: Canon Kabushiki Kaisha, Tokyo (JP)

(*) Notice: Subject to any disclaimer, the term of this patent is extended or adjusted under 35 U.S.C. 154(b) by 130 days.

(21) Appl. No.: 14/639,721

(22) Filed: Mar. 5, 2015

(65) Prior Publication Data
US 2015/0254873 A1    Sep. 10, 2015

(30) Foreign Application Priority Data

Mar. 6, 2014  (AU) ................................ 2014201243

(51) Int. Cl.
| | |
|---|---|
| G06K 9/48 | (2006.01) |
| G06T 9/20 | (2006.01) |
| G06T 1/20 | (2006.01) |
| G06T 9/00 | (2006.01) |

(52) U.S. Cl.
CPC ............. *G06T 9/20* (2013.01); *G06T 1/20* (2013.01); *G06T 9/00* (2013.01)

(58) Field of Classification Search
USPC ............... 382/242, 232, 266; 700/8; 712/32
See application file for complete search history.

(56) References Cited

U.S. PATENT DOCUMENTS

| | | | | |
|---|---|---|---|---|
| 5,487,172 | A * | 1/1996 | Hyatt | B60R 16/0373 700/8 |
| 7,545,988 | B2 * | 6/2009 | Meeker | H04N 19/63 382/232 |
| 9,345,589 | B2 * | 5/2016 | Stark | A61F 2/4644 |
| 2007/0257935 | A1 | 11/2007 | Koduri et al. | |
| 2008/0144952 | A1 | 6/2008 | Chen et al. | |
| 2008/0152221 | A1 | 6/2008 | Kadatch | |
| 2012/0268469 | A1 | 10/2012 | Shchepetov et al. | |
| 2013/0251256 | A1 | 9/2013 | Deng et al. | |

* cited by examiner

Primary Examiner — Anh Do
(74) Attorney, Agent, or Firm — Canon USA, Inc. I.P. Division

(57) ABSTRACT

Methods, apparatus, and computer readable media are provided for image compression. Edge elements of an image comprising pixels are established by analyzing pixel values associated with the pixels of the image. The edge elements are organized in an edge data structure having at least two dimensions. The edge data structure is compacted along a first dimension by arranging the established edge elements adjacent to each other along the first dimension in a compacted edge data structure. Compressed edges in a second dimension in the compacted edge data structure are determined by: determining edge elements to be joined along a second dimension in the compacted edge data structure based on pixel values of neighboring edge elements, along the second dimension, in the compacted edge data structure; and compressing the image by encoding formed edges, the edges being formed by joining the determined edge elements.

20 Claims, 27 Drawing Sheets

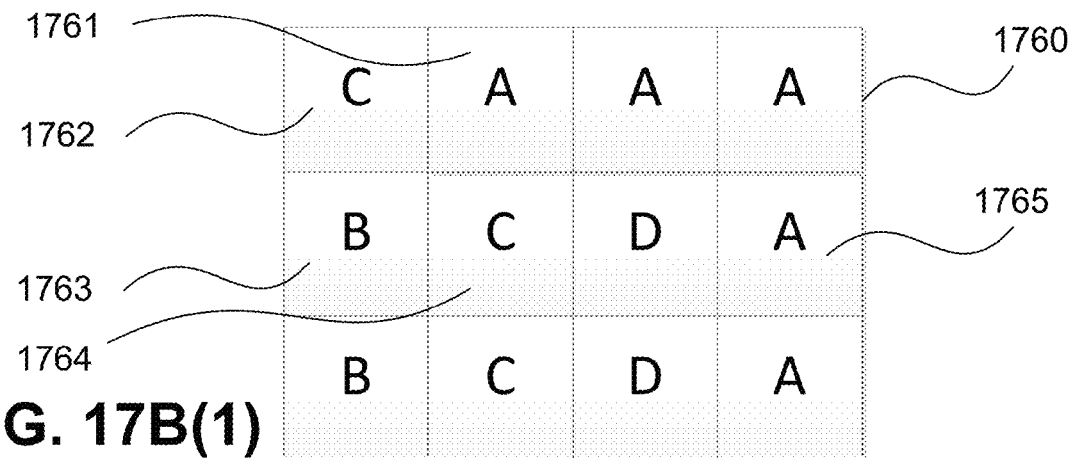
FIG. 17B(1)
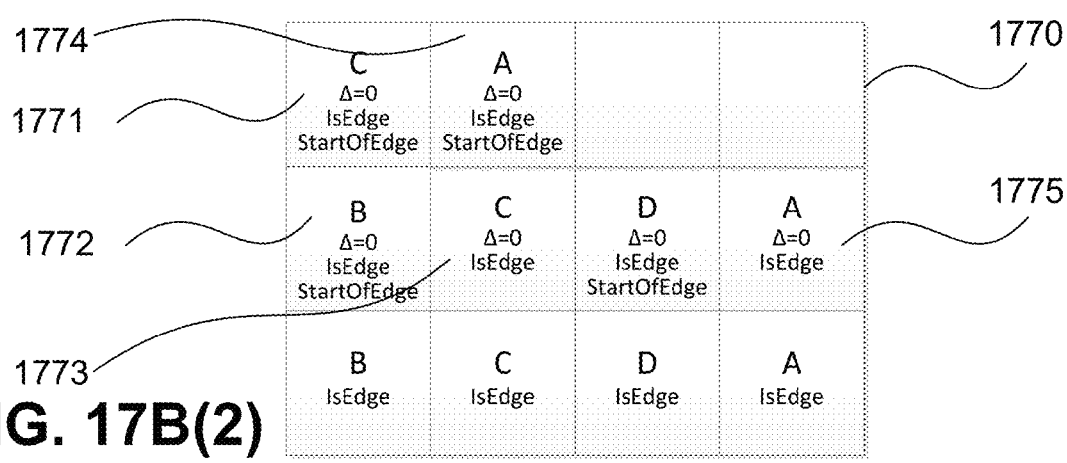
FIG. 17B(2)
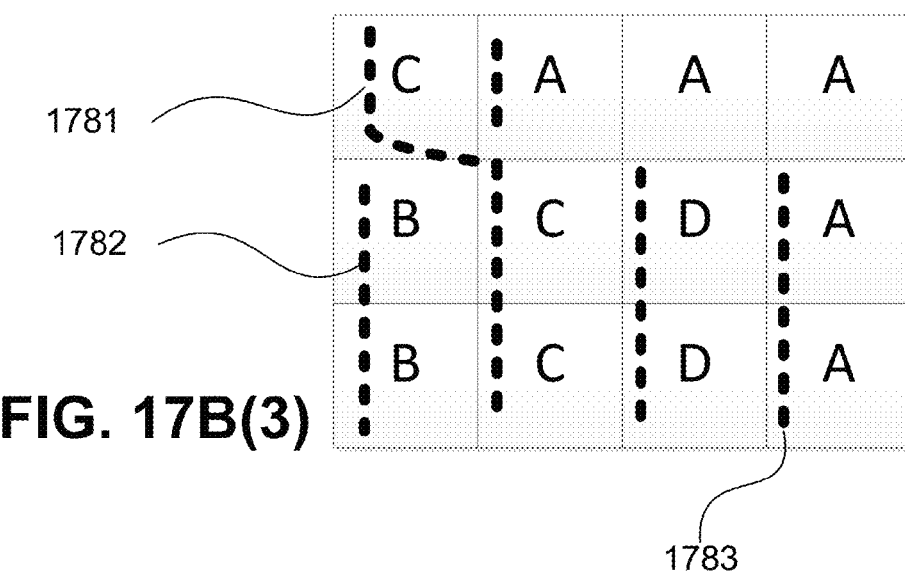
FIG. 17B(3)

PARALLEL IMAGE COMPRESSION

REFERENCE TO RELATED PATENT APPLICATION(S)

This application claims the benefit under 35 U.S.C. §119 of the filing date of Australian Patent Application No. 2014201243, filed Mar. 6, 2014, hereby incorporated by reference in its entirety as if fully set forth herein.

TECHNICAL FIELD

The present invention relates generally to computer-based systems, and in particular, the field of image compression.

BACKGROUND

Digitally encoded images are widely used in many fields. However, coding images often results in large files, resulting in high storage and communication costs. To alleviate these issues, extensive work has been conducted over many years to compress images down to more practical sizes.

Common image compression techniques (algorithms) are either lossy or lossless, which refers to whether or not any information is lost during the compression process.

Lossy compression is typically used to compress so-called natural images, which result from real world scans and photographs, for example. In contrast, lossless compression is often used for images substantially comprising computer-generated text and graphics, where large areas of the image contain the same pixel value. Such images, referred to as "flat images", are common in non-scanned still images.

Lossless compression allows perfect reconstruction of the original image without artefacts or lost information. However, reliance of lossless compression on the presence of large areas of like-coloured pixels to obtain sufficient compression means that lossless compression is unsuitable for natural images, which typically contain many small groups of such pixels.

Many lossless compression algorithms exploit redundancy in one dimension only. For instance, the lossless compression algorithms may compress in the x direction only (for instance, using run-length encoding). This limits the degree of compression that can be attained, leading to higher storage and communication costs.

Massively parallel processors such as Graphics Processing Units (GPUs) are becoming ubiquitous. However, many existing serial lossless compression algorithms do not run efficiently in these environments. GPUs require many data parallel threads for peak efficiency, whereas existing lossless compression algorithms are designed to run in a few threads only. Also, the memory usage patterns in existing algorithms generally do not suit the unique memory restrictions needed for efficient GPU operation.

SUMMARY

In accordance with an aspect of the invention, there is provided a method of image compression. The method comprises: establishing a plurality of edge elements of an image comprising a plurality of pixels by analysing pixel values associated with the pixels of the image, the plurality of edge elements being organised in an edge data structure having at least two dimensions; compacting the edge data structure along a first dimension by arranging the established edge elements adjacent to each other along the first dimension in a compacted edge data structure; and determining compressed edges in a second dimension in the compacted edge data structure by: determining edge elements to be joined along a second dimension in the compacted edge data structure based on pixel values of neighbouring edge elements, along the second dimension, in the compacted edge data structure; and compressing the image by encoding formed edges, the edges being formed by joining the determined edge elements.

The image compression may be implemented using a plurality of pixel threads, each thread from the pixel threads being assigned to process at least one pixel of the image data.

The establishing step may comprise concurrently analysing pixel values associated with the pixels of the image using the assigned pixel threads.

The compacting step may be implemented using a plurality of compacting threads assigned to each scanline in the edge data structure.

Two edges may be joined concurrently by separate edge threads.

The edges may be formed by joining the determined edge elements lying within a predetermined number of edge elements in the compacted edge data structure, the joining step comprising comparing, by an edge thread, the pixel value of a current edge element with at least one edge element in the subsequent scanline lying within a predetermined number of edge elements in the compacted edge data structure. The joining step may comprise selecting an edge element in the subsequent scanline to be joined with the current edge element in accordance with the direction of continuation associated with the current edge element.

The establishing step may comprise comparing a pixel value of a current pixel with a pixel value of at least one other pixel in the same scanline.

Each edge element may comprise: an edge element status (start, end), a possible direction of continuation of an edge associated with the edge element, a pixel value of the edge element, and a position in the image of the edge element.

The method may comprise compacting the established edge pixel data using a plurality of compacting threads for a scanline in a pixel data array to form a compacted pixel data array;

The edge elements may be established by analysing colour values of pixels. An edge may be formed by joining like-coloured determined edge elements. The method may comprise storing the determined compressed edges in storage device.

The compression is lossless.

The image compression may be implemented using a plurality of threads executing in a processing device comprising a plurality of processing units, at least two threads executing in at least two processing units in parallel.

The processing device may be a graphics processing unit (GPU) or coprocessor.

In accordance with another aspect of the invention, there is provided an apparatus comprising a processor and memory for image compression in accordance with the method of the foregoing aspect.

In accordance with yet another aspect of the invention, there is provided a non-transitory computer readable medium having recorded therein a computer program for image compression in accordance with the method of the foregoing aspect.

BRIEF DESCRIPTION OF THE DRAWINGS

Embodiments of the invention are described hereinafter with reference to the drawings, in which:

FIGS. 17B(1) to 17B(3) illustrate an example of edge formation, to illustrate the need for a second edge creation pass;

FIGS. 25A and 25B show a worked example of edge creation after compaction.

DETAILED DESCRIPTION INCLUDING BEST MODE

Figure 1:
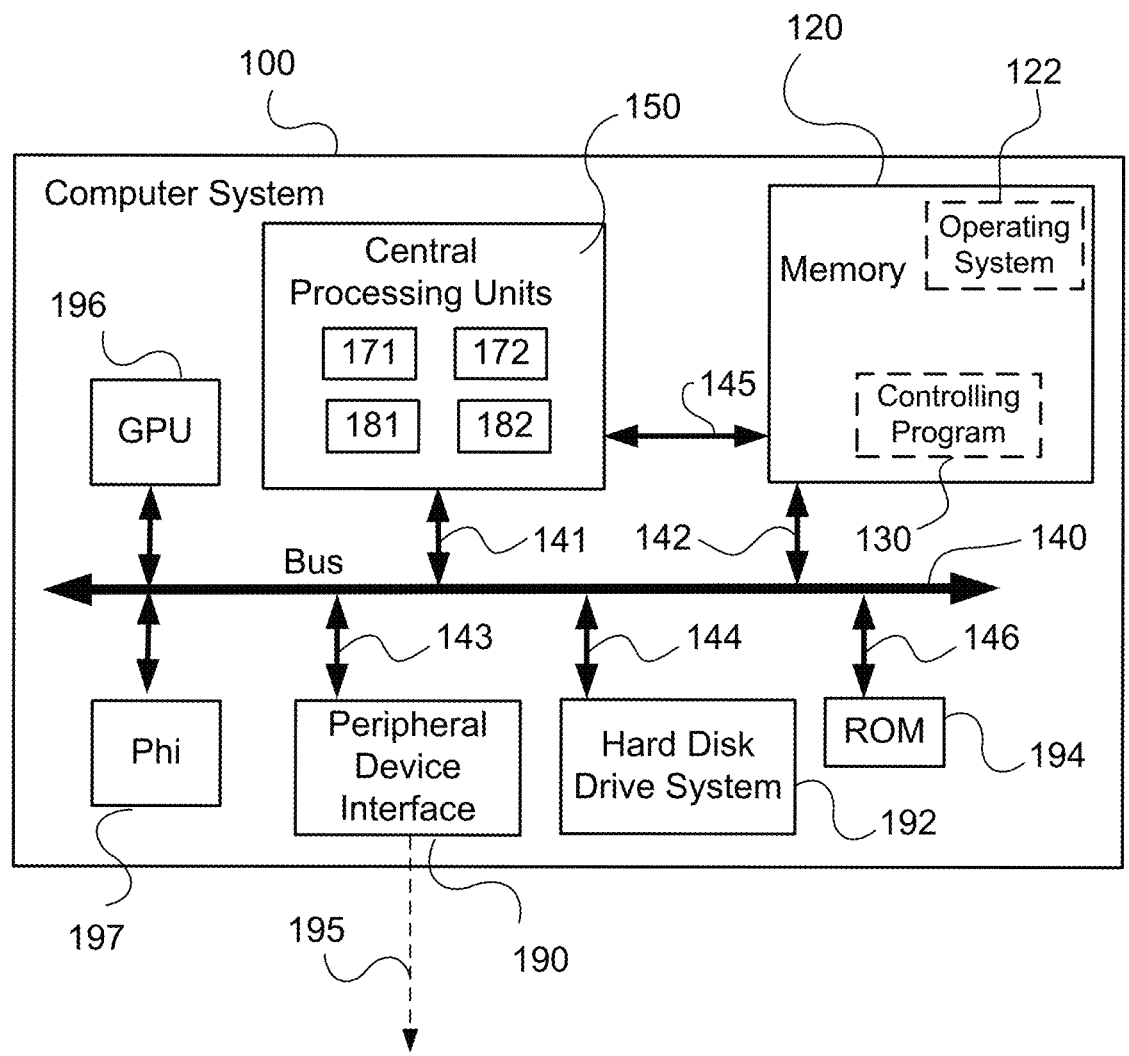
FIG. 1 is a schematic block diagram of a typical multi-processor computing system suitable for running the lossless compression algorithms of the embodiments of the invention.

Methods, apparatuses, and computer readable media are disclosed for image compression. In the following description, numerous specific details, including particular graphics processing units (GPUs), co-processors, numbers of threads, and the like are set forth. However, from this disclosure, it will be apparent to those skilled in the art that modifications and/or substitutions may be made without departing from the scope and spirit of the invention. In other circumstances, specific details may be omitted so as not to obscure the invention.

Where reference is made in any one or more of the accompanying drawings to steps and/or features, which have the same reference numerals, those steps and/or features have for the purposes of this description the same function (s) or operation(s), unless the contrary intention appears.

The embodiments of the present invention overcome, or at least ameliorate, the problems of existing lossless image compression techniques in massively parallel environments. Techniques are disclosed for efficiently producing lossless compressions of flat images, where the techniques exploit the two-dimensional nature of the content of such digital images and can be applied to many multi-processor architectures, the preferred architecture being a GPU. The embodiments of the invention achieve lossless compression on a GPU by utilising a compaction in the x dimension, together with a linking step in the y dimension.

Context

FIG. 1 shows a multi-processor computer system 100 with which the arrangements presently disclosed may be implemented. The computer system 100 may be a stand-alone computer, such as modern desk-top computers. Examples of such computers include IBM-PC's and compatibles, Sun Sparcstations, Apple Mac™ or a like computer systems. The computer system 100 may alternatively be part of, or wholly implement, a special-function apparatus such as a printer, imaging system, control system, or the like. The number of CPUs on each processing device or chip, the number of caches and their hierarchical organisation, and other computer system components, can vary widely. The computer system 100 has a number of central processing units 150, memory 120, peripheral device interface 190, a hard disk drive system 192, and read-only memory (ROM) 194; the foregoing components are interconnected via a bus 140 and associated respective connections 141, 142, 143, 144 and 146, as illustrated. The peripheral device interface 190 permits interconnection of the computer system 100 with other systems, including communication networks, other computers, devices such as printers and displays, and control devices such as keyboards and mouse pointing devices (not illustrated) via an optional connection 195. The central processing units 150 and the memory 120 have a dedicated connection 145, separate from the bus 140. The memory 120 as depicted in FIG. 1 represents an amalgam of various memory components and types used in typical computer systems. The memory 120 may therefore include L1 cache and L2 cache incorporated in microprocessor/microcontroller devices, L3 cache directly coupled to such devices, and so-called 'main' memory, all of which are typically implemented using semiconductor-based random access memory (RAM) and, for the RAM not integral with the processing units 150, as dedicated RAM devices. The computer system 100 may include other memory, this being represented by the hard disk drive (HDD) system 192, the ROM memory 194 and other devices, such as optical disk drives, PCMCIA drives, USB drives and the like, not illustrated from the sake of clarity, which traditionally exclusively couple to the bus 140 and not directly to the processing units 150.

In a typical computer system, the ROM 194 stores basic processes that enable the computer 100 to turn on and execute fundamental operating processes, including the booting of an operating system 122 of the computer 100, generally by copying the operating system 122 from permanent storage in the HDD 192 to the memory 120 for execution by the processing units 150. Other storage devices such as a floppy disk drive and a magnetic tape drive (not illustrated) may also be used. An optical disk drive is typically provided to act as a non-volatile source of data. Portable memory devices, such optical disks (e.g., CD-ROM, DVD, Blu ray Disc™), USB-RAM, portable, external hard drives, and floppy disks, for example, may be used as appropriate sources of data to the computer system 100. The operating system 122 provides for fundamental control of functions of the computer including low-level operational functions such as memory management, of which cache memory management forms a part. Thus, (higher-level) applications that may execute on the computer system 100 can avail themselves of the default memory management functions offered by the operating system. However, some (higher-level) applications prefer to assert the applications' own controlling influence over low-level operations, generally to achieve performance optimised or otherwise suited to the particular application. Such applications thereby provide, or are accompanied by, specific software applications configured to modify the low-level operation of the computer system 100 as desired by the higher-level application.

Typically, as seen in FIG. 1, a controlling program 130 is generally stored in the HDD 192 and copied from the HDD 192 to reside in the memory 120. The controlling program(s) 130 is thereby executable upon one or more of the threads associated with CPUs 171, 172, 181 and 182 of the central processing unit 150. Four CPUs 171, 172, 181 and 182 are shown in FIG. 1, but other numbers of CPUs may be practiced.

Often such a computing system 100 may contain a massively parallel processing device, such as a graphics processing unit (GPU) 196 or Intel® Xeon Phi™ Coprocessor 197. Whilst Intel® Xeon Phi™ devices are currently only installed on the bus 140, GPUs 196 may be either discrete and bus mounted, or co-located on-die alongside the CPUs 171,172, 181 and 182.

Figure 2:
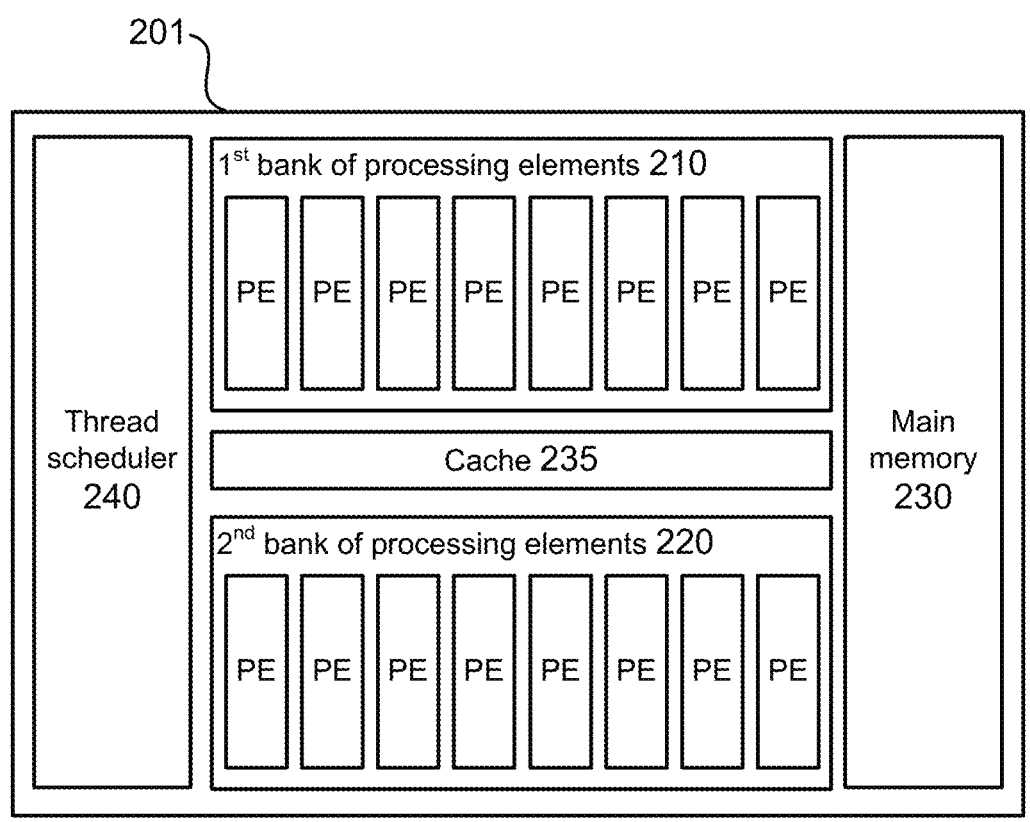
FIG. 2 is a schematic block diagram of a typical GPU processor.

A schematic block diagram of a GPU 196 is described hereinafter with reference to FIG. 2. The main component of a GPU 201 is its many processing elements. The example GPU 201 contains two banks of processing elements 210 and 220. Each processing element is capable of executing many threads of execution in parallel using one or more SIMD (single instruction multiple data) arrays. A processing element (PE) may also contain a small amount of fast cache memory and a scheduler for deciding which threads to execute at any given point in time. A higher-level thread scheduler 240 allocates blocks of threads to individual processing elements. Another level of cache memory 235 is typically provided between the processing elements 210 and 220, and main memory 230. Main memory 230 may be a subset of the host computing system's memory 120, or may be entirely separate memory that is considered part of the GPU 201. Main memory 230 is typically large and slow to access. Many variations in GPU architecture exist, but most architectures share the general components shown in FIG. 2.

The method of parallel image compression in accordance with embodiments of the invention may be implemented using the computer system 100. The processes depicted in FIGS. 3 to 25 may be implemented as one or more software application programs 130 executable within the computer system 100. In particular, the steps of the method of parallel image compression are affected by instructions in the software 130 that are carried out within the computer system 100. The software instructions 130 may be formed as one or more code modules, each for performing one or more particular tasks. The software may also be divided into two separate parts, in which a first part and the corresponding code modules performs the parallel image compression methods and a second part and the corresponding code modules manage a user interface between the first part and the user.

The software may be stored in a non-transitory computer readable medium, including the storage devices 192, 190/195, for example. The software is loaded into the computer system 100 from the computer readable medium, and then executed by the computer system 100. A computer readable medium having such software or computer program recorded on the computer readable medium is a computer program product. The use of the computer program product in the computer system 100 preferably affects an advantageous apparatus for parallel image compression.

The software 130 is typically stored in the HDD system 192 or the memory 120. The software is loaded into the computer system 100 from a computer readable medium, and executed by the computer system 100. Thus, for example, the software 130 may be stored on an optically readable disk storage medium (e.g., CD-ROM) that is read by a peripheral device (not shown) using interface 190. A computer readable medium having such software or computer program recorded on it is a computer program product. The use of the computer program product in the computer system 100 preferably affects an apparatus for parallel image compression.

In some instances, the application programs 130 may be supplied to the user encoded on one or more CD-ROMs and read via a corresponding drive, or alternatively may be read or downloaded by the user from a computer networks (not shown in FIG. 1). Still further, the software can also be loaded into the computer system 100 from other computer readable media. Computer readable storage media refers to any non-transitory tangible storage medium that provides recorded instructions and/or data to the computer system 100 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer system 100. Examples of transitory or non-tangible computer readable transmission media that may also participate in the provision of software, application programs, instructions and/or data include radio or infra-red transmission channels as well as a network connection to another computer or networked device, and the Internet or intranets including e-mail transmissions and information recorded on Websites and the like.

The second part of the application programs 130 and the corresponding code modules mentioned above may be executed to implement one or more graphical user interfaces (GUIs) to be rendered or otherwise represented upon a display (not shown in FIG. 1). Through manipulation of typically a keyboard and the mouse, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers and user voice commands input via the microphone.

The embodiments of the invention relate to an image compression algorithm, which can run as a program on one or more of the central processing units (CPUs) 171, 172, 181 and 182, GPU 196 or Intel® Xeon Phi™ coprocessor 197 (or other parallel hardware). Typically, an image is obtained via a peripheral device interface 190 or off the hard disk (HDD) 192, or from another application operating inside the computing system, before being used as input to the compression program.

Overview

The embodiments of the invention compress a flat colour image. This is done by producing a series of edges, where each edge represents a boundary between regions of different pixel colour.

Figure 3:
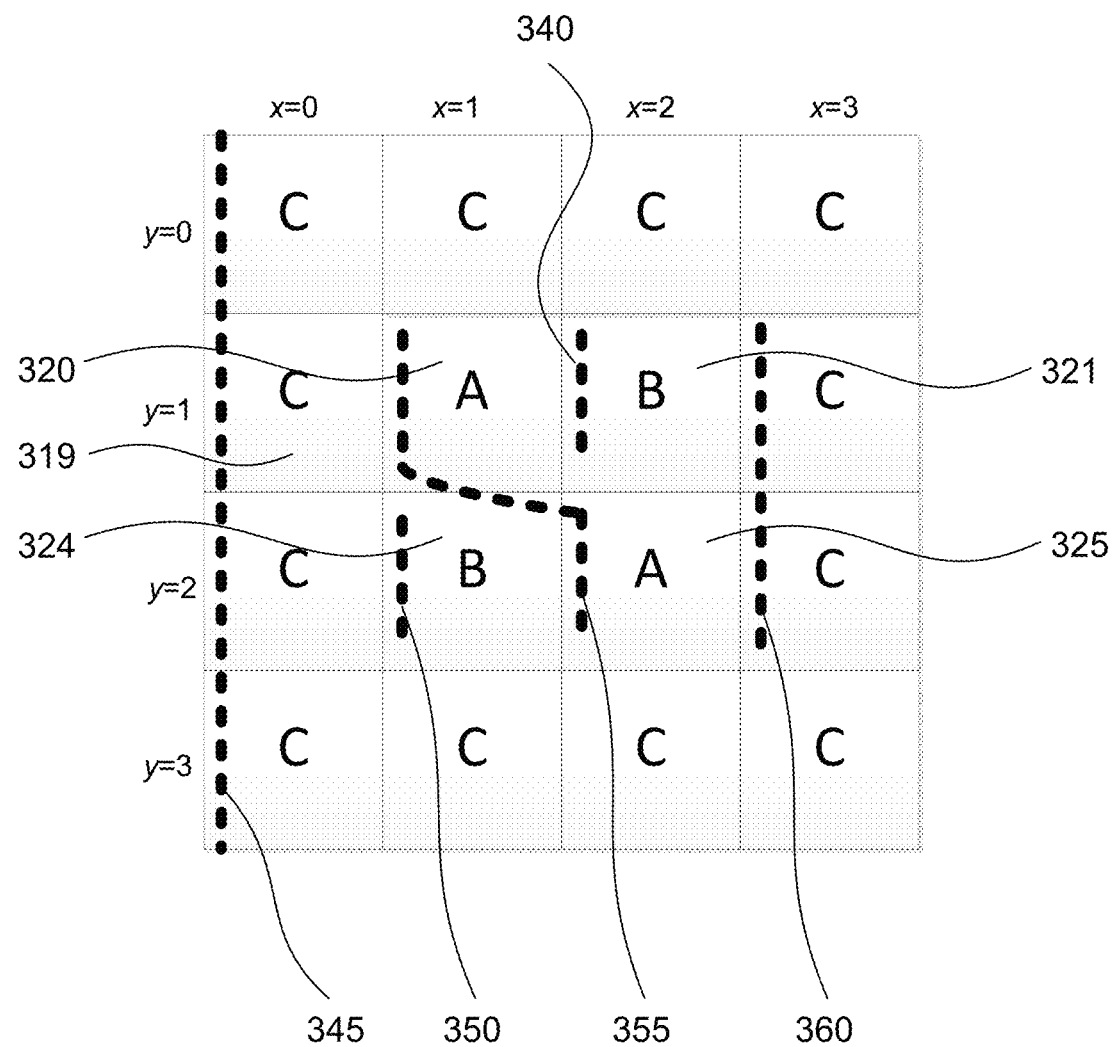
FIG. 3 illustrates pixel and edge concepts.

Moving across a scanline of an image in increasing x, a pixel at x which has a different colour to the pixel at x−1 on the same scanline is considered an edge pixel. In this way, edges mark transitions between regions of different colour. FIG. 3 illustrates these concepts. FIG. 3 depicts a 4×4 pixel image that has colours represented by the letters A, B and, C, each being a different colour. In line y=0, all the pixels have the same colour C at x=0-3. Moving between pixels of increasing x along the scanline at y=1, there is a difference in colour between the pixel at x=0 319 and that at x=1 320, so the pixel 320 is considered an edge pixel. The joining together of like-coloured edge pixels across scanlines forms edges 340, 345, 350, 355 and 360, here shown as dashed lines. In the preferred embodiment of the invention, edges cannot cross each other, for example, different edge identifiers are created for edges 340 and 350. FIG. 3 is described further hereinafter.

Figure 4:
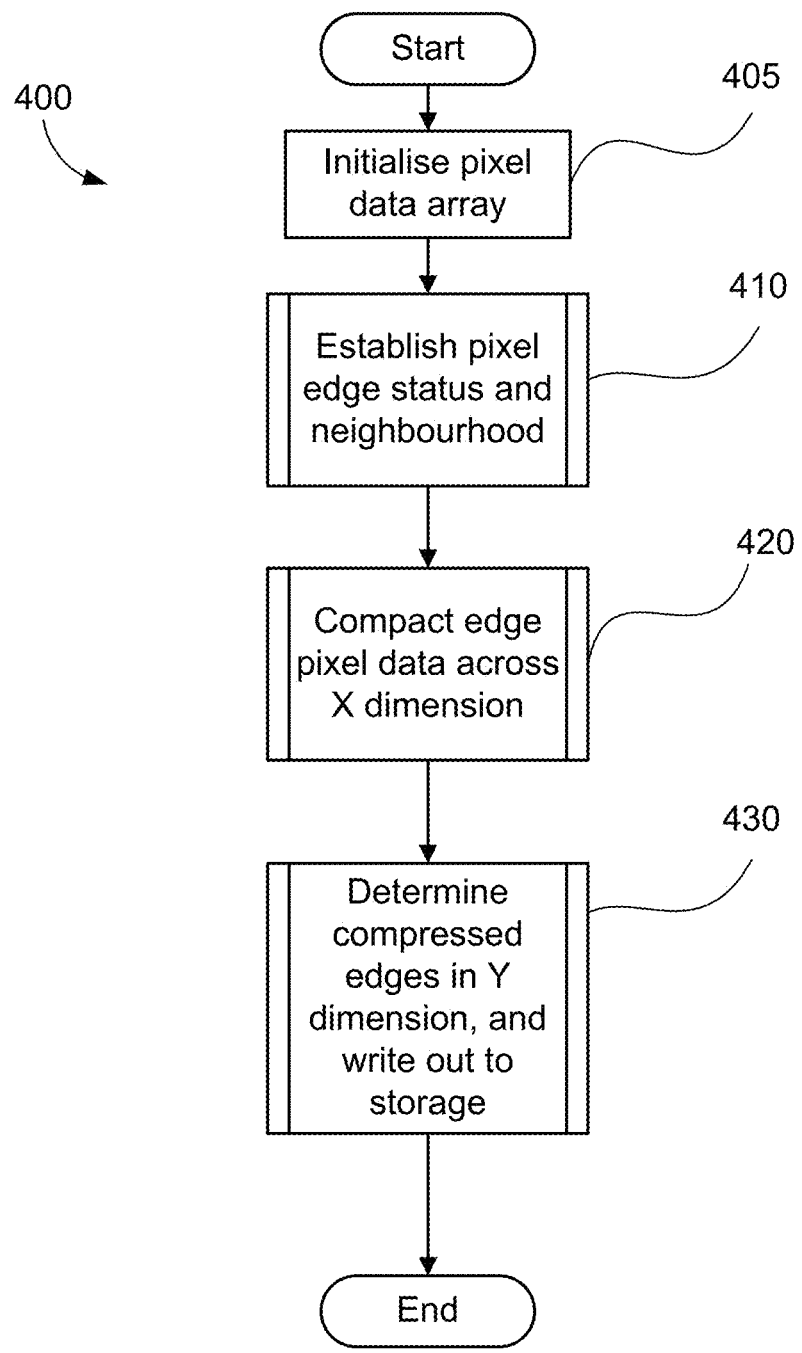
FIG. 4 is a schematic flow diagram outlining a method of compressing a flat image in accordance with the embodiments of the invention.

The parallel image compression technique 400 disclosed herein uses the broad steps shown in the flow diagram in FIG. 4. The method 400 begins at step 405, which initialises a pixel data array, a data structure for intermediate processing. The pixel data array is a two-dimensional (2D) data array, with data sections corresponding to each pixel in the 2D image.

In step 410, pixel edge status and neighbourhood are established. The routine 410 gathers status about each pixel, including whether the pixel is part of an edge and where that edge may extend onto adjoining scanlines. The routine 410 also stores each pixel's x value within the scanline and the pixel's colour. The routine receives an image comprising a two-dimensional area of colour pixels, each pixel storing a number that corresponds to a representation of some colour. The pixel status gathering routine 410 examines each pixel and the pixel's neighbourhood to establish whether that pixel is part of an edge. Only a small neighbourhood around the pixel is examined, to maximise caching opportunities in the GPU (this is discussed further hereinafter). If a pixel is found to be part of an edge, details are recorded in the pixel data array for that pixel. The recorded data includes whether the pixel appears to be the topmost pixel of the edge, and the likely direction in which the edge links to the scanline below. This direction information can be used in subsequent routines to increase the image compression rate during edge formation. The pixel status gathering routine 410 described in more detail hereinafter with reference to FIG. 6.

At step 420, the edge pixel data across the x dimension is compacted. The entries in the pixel data array corresponding to edge pixels, and only those entries, are compacted to the left horizontally (i.e., towards minimum x), row by row. In the preferred embodiment, this step 420 is performed using a prefix sum algorithm, organised as a compaction. Step 420 is described in more detail hereinafter with reference to FIG. 15.

Step 430 determines compressed edges in the y dimension and writes the edges out to storage. This involves identifying and reading the edges using the data in the compacted pixel data array. This processing starts at each entry in the pixel data array corresponding to the pixel that was identified in the pixel status gathering step 410 to be the topmost pixel of an edge. Step 430 uses information from the entry to join edge pixels in a parallel process in the y direction, row by row, until the end of each edge is reached. Forming edges from this compacted form confers higher compression opportunities than if forming edges is performed on the original pixel neighbourhood in step 410. The higher information density in the compacted form allows the GPU to reach across a far larger range of pixels for edge analysis than would be possible without compaction. The edges are written to output storage. Step 430 is described in more detail hereinafter with reference to FIG. 17A.

Steps 410 and 430 have similarities in the steps' algorithms, as steps 410 and 430 both contribute to establishing minimum edge count (and thus maximum compression). Step 410 provides hints as to likely edge directions, which are subsequently used in step 430 to confirm the edges from the compacted data structure. Similar algorithms for edge linking are used in both cases.

Routine 400 ends upon completion of step 430.

Embodiments

An embodiment of the invention is now described, based on the broad steps in FIG. 4.

The preferred embodiment utilizes a GPU to supply parallel computation capabilities for performing every step of the image compression routine 400.

Most current GPUs have a hardware limitation in that a thread working on one pixel cannot access a pixel more than a certain number of pixels away without invoking a memory cache miss and thus incurring a significant speed penalty. For instance, some GPUs being used in a certain way may not allow a thread processing a particular pixel to look more than two pixels distant in the scanline below without invoking a cache miss. The term "range" of pixels refers to a horizontal odd-numbered run of pixels on the scanline immediately below or above that pixel, with the pixel run centred on the pixel's x value. The term "range" is only used when referring to the scanline directly above or directly below. "RangeSize" refers to a hardware-determined ideal range size, as determined to minimise cache misses. For instance, a RangeSize of three pixels above a current pixel refers to a range containing the pixel directly above the current pixel and to the pixels either side of that. For instance, in FIG. 14, with a RangeSize of 3, the range for pixel 1421 on the scanline above consists of pixels 1416, 1417 and 1418. The range for the scanline below consists of pixels 1424, 1425 and 1429.

The processing steps presume that a GPU has the capacity to process all the pixels in an image. If this is not the case, the image can be tiled into groups of pixels that are within the GPU's capacity, where tiles can be processed individually (possibly in parallel using multiple GPUs) in a tile-parallel manner well known in the art.

Figure 5:
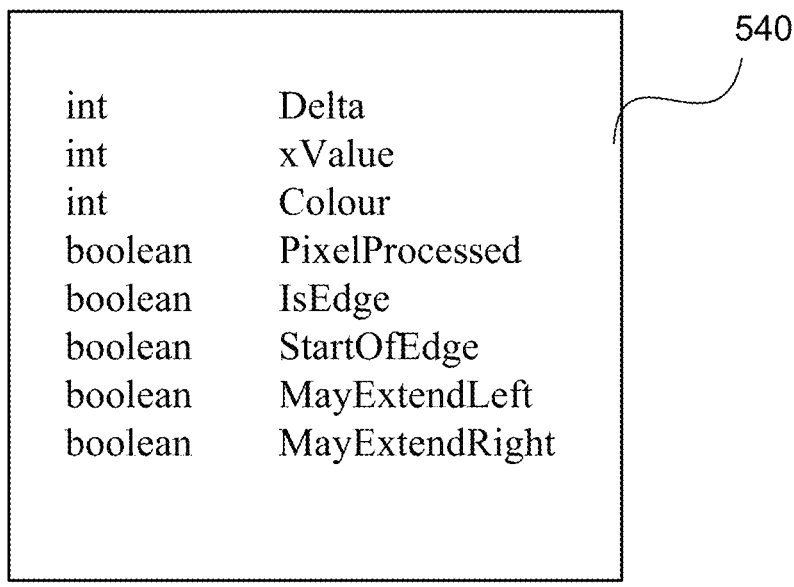
FIG. 5 is a block diagram illustrating the fields inside each pixel data array entry.

In preparation for the image compression, a pixel data array is assigned and initialised at step 405 with the same dimensions as the incoming image. Each entry in this pixel data array corresponds to the status of the corresponding pixel in the image. In a GPU, this may be resident in writable texture memory, in order to take advantage of that memory's two-dimensional caching capability. FIG. 5 shows a data structure 540 allocated for each pixel within the pixel data array. Each entry maintains various status values for the corresponding pixel, including:

(i) whether the pixel is part of an edge ("IsEdge"),
(ii) whether the pixel starts an edge ("StartOfEdge"),
(iii) values representing the possible movement of the edge onto the next scanline ("Delta", "MayExtendLeft" and "MayExtendRight"),
(iv) the original x value of the pixel in the scanline ("xValue"),
(v) the pixel colour ("Colour"), and
(vi) the current processing status ("PixelProcessed").

Note that the data is organised as planes of data to facilitate parallel processing, i.e. all the "Delta" data for the pixel data array is grouped in one place in memory, followed by all the "xValue" data, and so on. This method of organisation minimises cache misses in the GPU. During step 405, the integer values are set to zero, and all the boolean values to false. The Colour variable however is set to −1 to indicate no valid colour.

In the routine to follow, a single dedicated GPU thread is allocated to address one pixel's data in the pixel data array, such that all the data can be addressed in parallel with all the GPU's threads.

Figure 6:
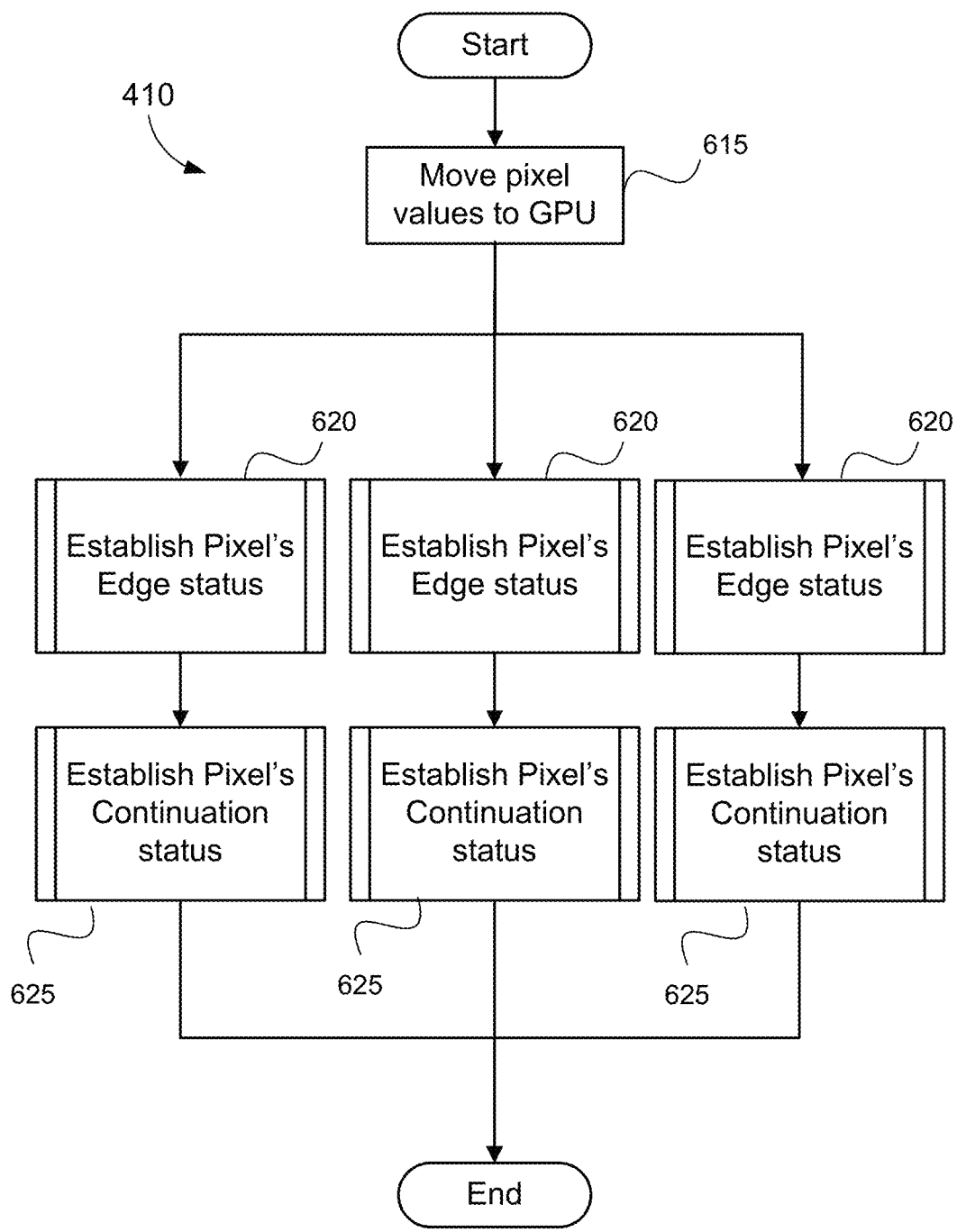
FIG. 6 is a schematic flow diagram providing an overview of the parallelism of a process of establishing the edge status and context of pixels in an image.

The pixel status gathering routine 410 of FIG. 4 is shown in more detail in FIG. 6. In a massively parallel environment such as in a GPU, each pixel is processed in parallel by a different processor.

Processing commences in step 615. In step 615, pixel values are moved to the GPU. Step 615 copies the pixels to be processed from the image to the GPU. To establish the status of each pixel, two routines 620 and 625 are run one after another. Step 620 establishes a pixel's edge status, and step 625 establishes a pixel's continuation status. In FIG. 6, there are three parallel pathways or branches each comprising step 620 and 625 between step 615 and the end step. While three branches are shown in FIG. 6, the three branches are meant to represent 'many' (similarly on steps 1504 and 1740). Since each branch is a pixel being processed, the number of branches is equivalent to the pixel count, clamped down to the thread capacity of the GPU. Such routines are typically organised as kernels, i.e. the routines are programs that are run in parallel across a large number of threads, with one thread dedicated to each pixel. Once routine 620 is run across all the pixels, routine 625 is run across all pixels. Routines 620 and 625 are described in detail hereinafter in reference to FIGS. 9 and 10, respectively.

Figure 7A:
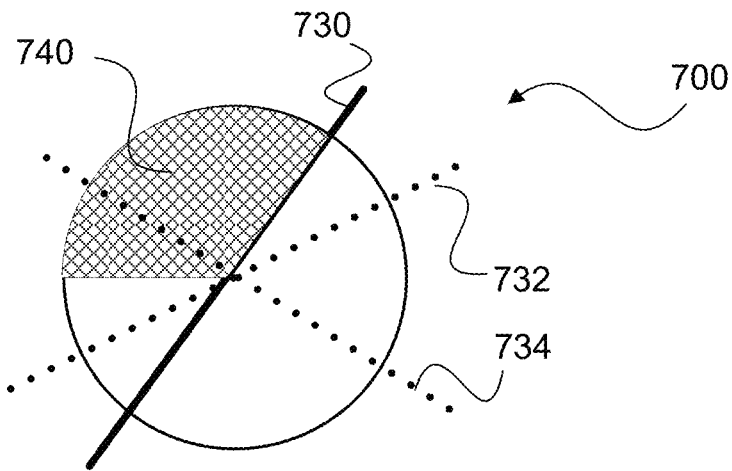
FIGS. 7A and 7B depicts image fragments to illustrate crossed edge avoidance concepts.
Figure 7B:
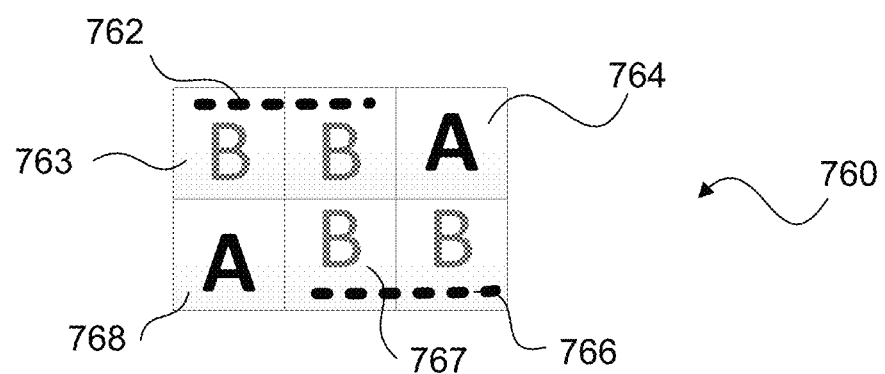

Before continuing, the issue of crossed edges is discussed. The following routines seek to determine edges using identified edge pixels. However, the routines need to avoid edges crossing each other, as this would make subsequent decompression much more difficult. Referring to FIG. 3, the edge 355 joins the edge pixels at 320 and 325 of colour A. However, the edge pixels at 321 and 324 can also be linked, since the edge pixels at 321 and 324 share the same colour B. However, doing so would result in two crossed edges. To avoid this situation, the routines described hereinafter check for edge crossings when forming edges; when crossings are detected, the routines stop such crossed edges from occurring. The routine must decide which edges dominate in the event of contention. FIGS. 7A and 7B explain how the decision is made as to whether a potential edge link is crossed by another.

Image fragment 700 in FIG. 7A shows an edge 730 being examined for a potential cross. The edge 730 (solid line) may be crossed by two other potential edges 732 and 734 (dotted lines), and the routine decides whether either of these other potential edges 732 and 734 crosses the proposed edge 730. The routine does this by establishing whether any of these other potential edges 732 and 734 bisect the region 740 (crossed hatching), which is the region stretching anticlockwise from the proposed edge 730 around to the horizontal. If any of the other potential edges 732 and 734 do, the edge 734 crosses (within this definition) the proposed edge 730, and the proposed edge 730 is considered crossed and should be abandoned. Edge 734 intersects region 740 and so crosses the proposed edge 730, causing the edge 730 to be abandoned. However, edge 732 does not intersect region 740, and so the edge 732 is determined not to cross the proposed edge 730. Where two pixels are being joined, the term 'link' is used rather than edge, since there are occasions when such linkages may subsequently be rejected as an edge. In all other circumstances, the term 'edge' is used.

FIG. 7A shows the theory behind edge cross determination. FIG. 7B shows a practical example of the process.

For clarity, RangeSize is assumed to be 5 in 760. Pixel 764 is potentially being joined by an edge to pixel 768, but first a check must be made to see if any other edges might cross the proposed edge. The routine checks the potential edge connections between every pixel in the range 762 to every pixel in the range 766. The sizes of these ranges are both calculated as (RangeSize−1)/2, and the ranges extend left from the top pixel and right from the bottom pixel. This choice of ranges allows the check for potential edges only in the described region 740 of FIG. 7A. If any edge pixel in the range 762 shares a colour with a pixel in the range 766, a crossed edge is determined to have been found. The routine finds that pixels 763 and 767 share a colour, and so the proposed link between pixel 764 and pixel 768 is abandoned as crossed. At some other time, the routine may be called to establish whether a proposed link between pixel 763 and 767 is crossed, but the process of establishing test ranges does not include testing the potential link between pixels 764 and 768, and so there is no conflict (with that edge, at least).

Figure 8:
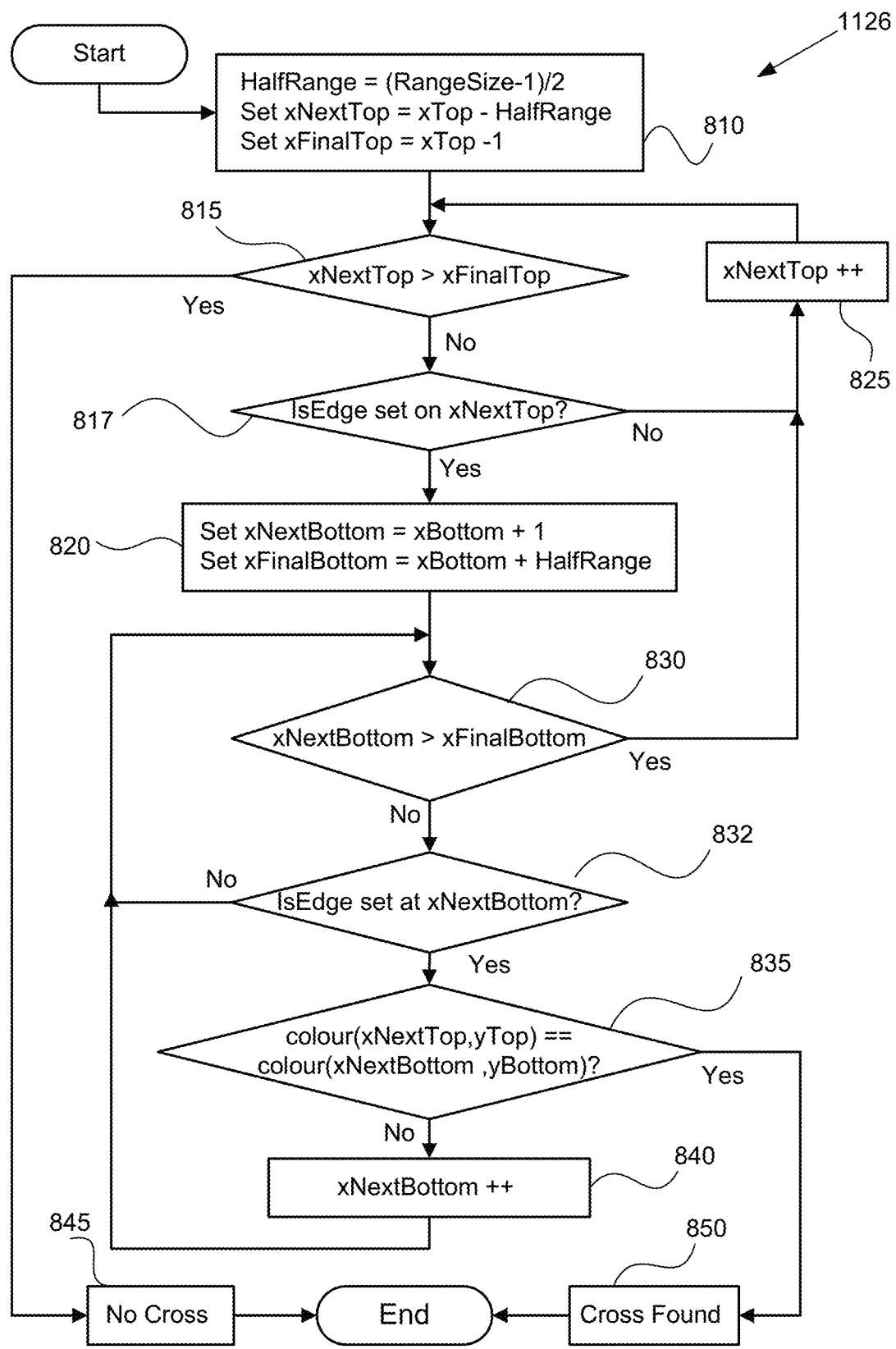
FIG. 8 is a schematic flow diagram illustrating a process of avoiding crossed edges.

FIG. 8 shows a method 1126 to establish whether one edge crosses another. The routine 1126 operates on the pixel data array, as part populated in step 620. The routine 1126 establishes a test range of pixels on one row and a test range of pixels on the next row. Routine 1126 considers all the test pixels in all combinations to see if a cross exists with a potential edge being examined. The routine's input is two pixels, one at location $(x_{top}, y_{top})$ on one row and one at location $(x_{bottom}, y_{bottom})$ on the row directly beneath.

In FIG. 8, the method commences processing at step 810. At step 810, a constant HalfRange is determined as (RangeSize−1)/2, a variable $x_{NextTop}$ represents the x value of the pixel currently active on the top row, and a variable $x_{FinalTop}$ represents the x value of the pixel on the top row which is the last to be tested. With variable $x_{NextTop}$ set as $x_{top}$−HalfRange and $x_{FinalTop}$ set as $x_{top}$−1, the top pixel range is now identified. At decision step 815, a check is made to determine if the variable $x_{NextTop}$ has exceeded $x_{FinalTop}$. If step 815 returns true (Yes), the routine ends, signalling at step 845 that no cross was found. Processing then ends. If step 815 returns false (No), processing continues at decision step 817. In decision step 817, a check is made to determine if IsEdge is set on $_{xNextTop}$. If step 817 returns true (Yes), confirming that this is indeed an edge pixel, processing continues at step 820. In step 820, the variable $x_{NextBottom}$ is set to $x_{bottom}+1$, and the variable $x_{FinalBottom}$ is set to $x_{bottom}+$ HalfRange. Step 820 establishes the bottom range of pixels, ready for comparison with the selected upper pixel $x_{NextTop}$. The variable $x_{NextBottom}$ is the next pixel to be checked and is initialised as the start of the test range, at $x_{bottom}+1$. The variable $x_{FinalBottom}$ is set at the end of the test range on the bottom row, at $x_{bottom}+$HalfRange. This process ensures that all of the possible combinations of edges are tested to see if any edges actually cross the potential edge. Where any x value in either range exceeds the edges (left or right) of the image, that range must be truncated to those edge values. Processing continues from step 820 to decision step 830. Referring to decision step 817, if that step returns false (No), processing continues at step 825. In step 825, the variable $x_{NextTop}$ is incremented, and processing returns to decision step 815.

The method 1126 tests the pixel in the top test range with each of the pixels in the bottom test range, looking for colour matches. In decision step 830, a check is made to determine if the variable $x_{NextBottom}$ exceeds $x_{FinalBottom}$. That is, a check is made if all pixels in the bottom test range have been exhausted. If step 830 returns true (Yes), processing continues at step 825. Otherwise, if step 830 returns false (No), processing continues at step 832. In decision step 832, a check is made to determine if IsEdge set at $x_{NextBottom}$. That is, the IsEdge boolean is checked for the current bottom pixel. If decision step 832 returns false (No), processing continues at step 830. Otherwise, if step 832 returns true (Yes), processing continues at step 835. In step 835, a check is made to determine if the colour of the current pixel (at $x_{NextTop}$, $y_{Top}$) in the top test range is equal to the colour of the current pixel (at $x_{NextBottom}$, $y_{Bottom}$) in the bottom test range. If at step 835 the colours match (Yes), the method 1126 proceeds to step 850 and signals at step 850 that a cross has been found. The process then ends. However, if at step 835 the colours do not match (No), processing continues at step 840, where $x_{NextBottom}$ is incremented. That is, the routine moves to the next x value in the bottom range. Processing then continues at step 830. Step 830 determines if the bottom test range of pixels have been exhausted. If more are available, at step 825, the $x_{NextTop}$ is incremented, and the process repeated for this next pixel value in the top row. If no crosses are found, eventually step 815 reaches the end of the top test range, and the routine signals at 845 that no cross has been identified.

Referring to FIG. 6 again, the steps 620 and 625 for establishing a pixel's edge and linkage status, respectively, are described hereinafter. This process is divided into two sub routines, because the first must be completed before the second begins. Step 620 is described with reference to FIG. 9 where all pixels are tested to see if the pixels are edge pixels.

Figure 9:
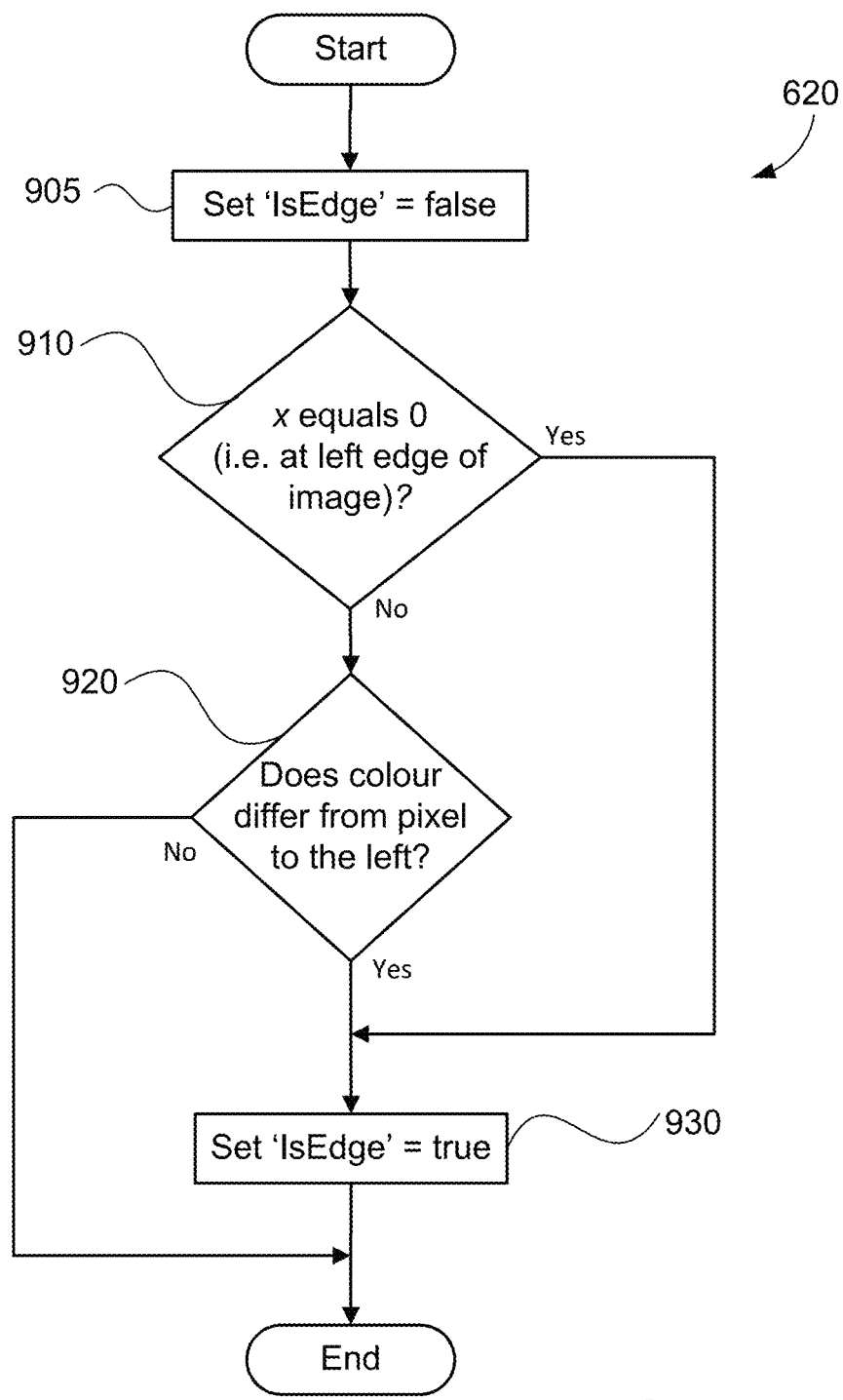
FIG. 9 is a schematic flow diagram illustrating a process of establishing a pixel's edge status.

Referring to FIG. 9, processing commences at step 905. In step 905, the routine (running in parallel as a kernel on every pixel) sets is IsEdge equal to false. This initialises the IsEdge boolean in the pixel's entry in the pixel data array to false. At decision step 910, a check is made to determine if x equals 0. That is, is the assigned pixel at the left edge of the image, i.e. at x=0? If step 910 returns true (Yes), processing continues at step 930. In step 930, IsEdge is set to true. That is, this pixel's entry in the pixel data array has IsEdge set to true. This is done, because all left-most boundary pixels of the image are considered edge pixels. However, if step 910 returns false (No), processing continues at step 920. This means the pixel is not at the left-most boundary. In decision step 920, a check is made to determine if the colour differs from the pixel to the left, i.e., to compare if the colour of its assigned pixel differs from the colour of the pixel to its immediate left. If the colours differ (Yes), processing continues at step 930, where this pixel's entry in the pixel data array has IsEdge set to true. Processing then ends. If decision step 920 returns false (No), processing ends.

Figure 10:
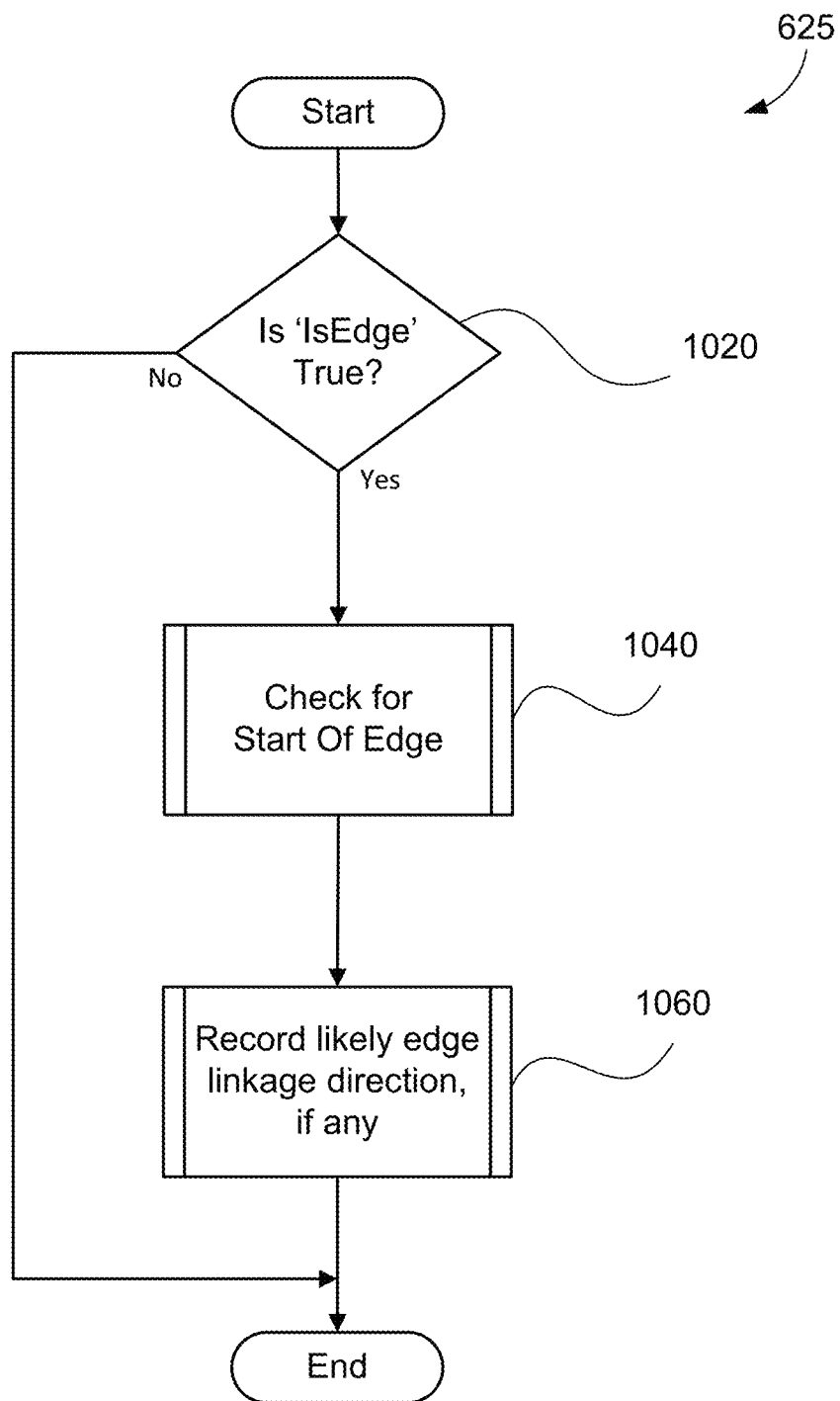
FIG. 10 is a schematic flow diagram illustrating a process of establishing a pixel's edge context.

FIG. 10 illustrates in detail step 625 of FIG. 6. The method 625 establishes information about the way an edge may link or connect up and down from this edge pixel, using the IsEdge information in the pixel data array. Processing commences at step 1020. In decision step 1020, a check is made to determine if IsEdge is true. That is, step 1020 confirms that the entry in the pixel data array has IsEdge set to true, and if not, the routine ends. If step 1020 returns false (No), processing ends. However, if step 1020 returns true (Yes), processing continues at step 1040. In step 1040, a check for Start of Edge is made. A check is made to establish whether this pixel is at the start of the edge, i.e., the edge does not extend into the current scanline from the previous scanlines. Step 1040 is described hereinafter in more detail with reference to FIG. 11, which tests for the possibility of an edge pixel in the row above that may link down to the pixel of interest.

For the following routines, the current pixel refers to the currently active pixel within the pixel data array, and $X_{current}$ and $Y_{current}$ refer to the x and y value of the current pixel on its scanline. The target pixel refers to some pixel in the row above or below, and the x value of the target pixel is called $X_{target}$. Again, the term "range" refers to a horizontal odd-numbered run of pixels centred on the pixel immediately below or above the current pixel with length "RangeSize". The term "ImageWidth" refers to the width of the image in pixels. Step 1040 is described in greater detail, before continuing with the description of FIG. 10 further.

Figure 11:
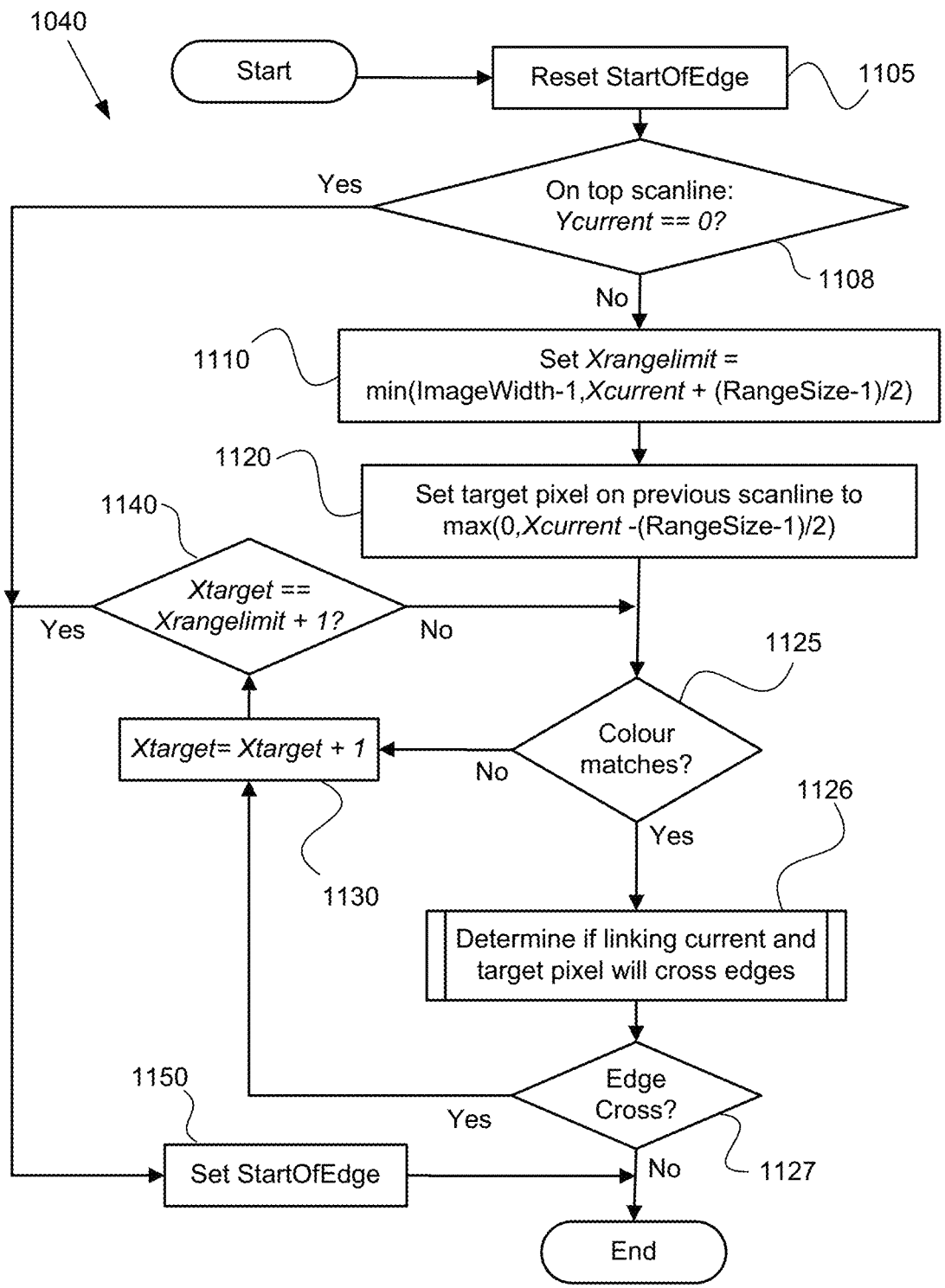
FIG. 11 is a schematic flow diagram illustrating a process of establishing whether a pixel forms the start of an edge.
Figure 12A:
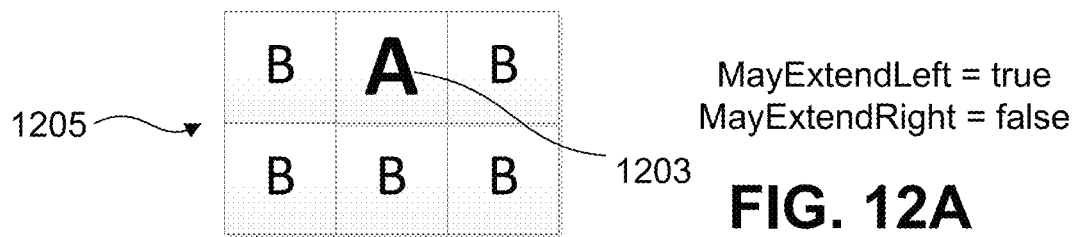
FIGS. 12A-12F are block diagrams outlining a pixel-joining process.
Figure 12B:
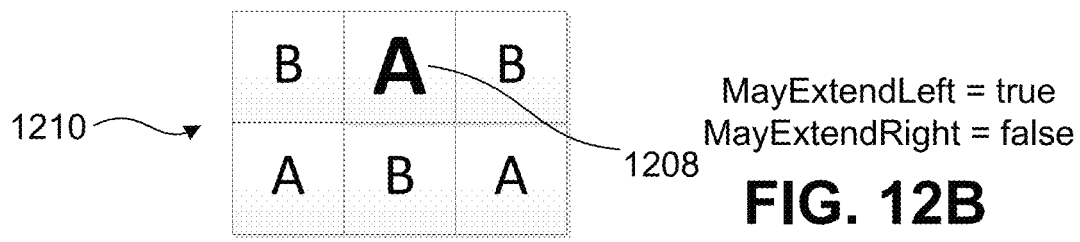
Figure 12C:
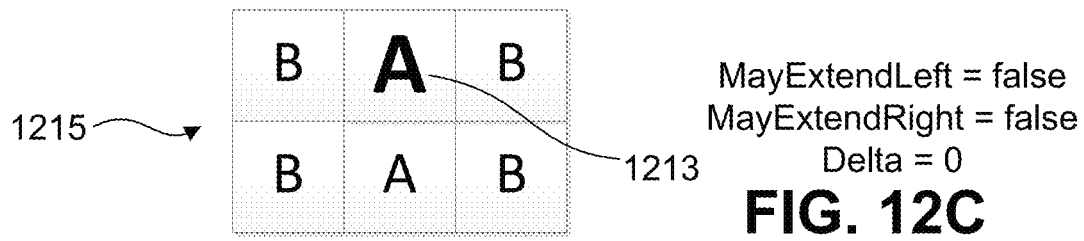
Figure 12D:
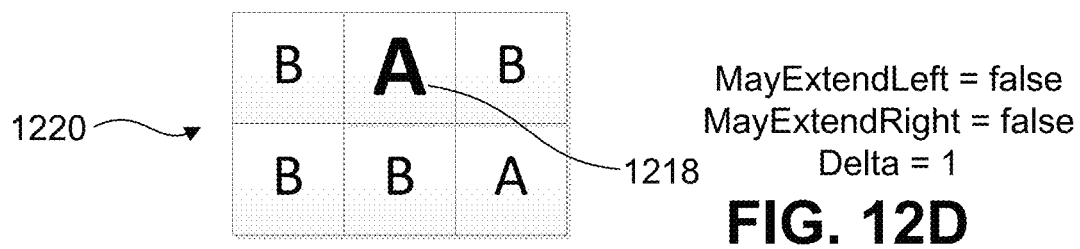
Figure 12E:
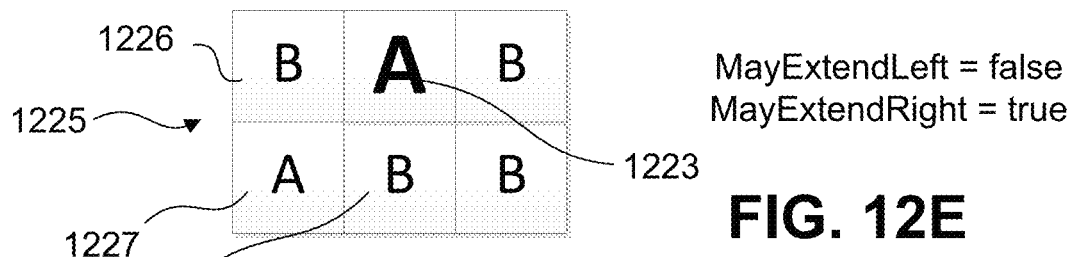
Figure 12F:
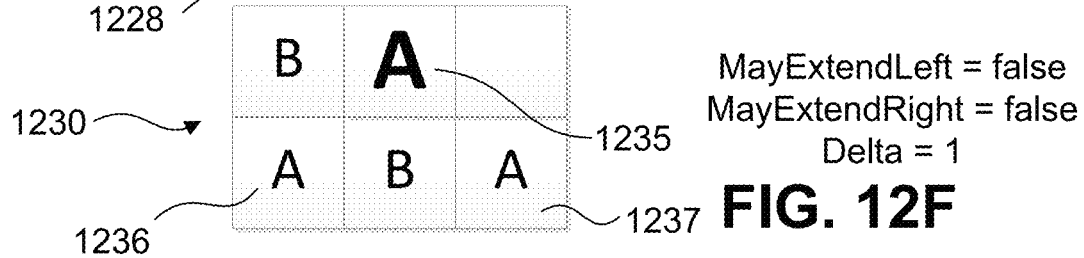

FIG. 11 illustrates step 1040 (Check for Start of Edge) of FIG. 10 in detail. Processing commences at step 1105. In step 1105 of routine 1040 StartOfEdge is reset. This step sets the default status of the current pixel as being not the start of an edge, by assigning false to the boolean StartOfEdge in the corresponding entry for this pixel in the pixel data array. In decision step 1108, a check is made on the top scanline if $Y_{current}$=0. Step 1108 establishes whether the current pixel is on the top scanline of the image by checking if $Y_{current}$ is equal to 0. If step 1108 returns true (Yes), processing continues at step 1150. In step 1150, the StartOfEdge flag is set for the entry for this pixel in the pixel data array, and processing of routine 1040 ends. However, if step 1108 returns false (No), meaning the current pixel is found to be not on the top scanline, processing continues at step 1110. That is, the routine 1040 goes on to examine a range of pixels in the scanline directly above the current pixel. Step 1110 sets:

$$X_{rangelimit}=\min(ImageWidth-1, X_{current}+(RangeSize-1)/2).$$

Doing so establishes the highest target x value to be checked. This sets the right limit of the x range as being the current location x value plus half the RangeSize, or the right side of the image, whichever is smaller. Step 1120 sets:

$$X_{target}=\max(0, X_{current}(RangeSize-1)/2).$$

The first target pixel location in the scanline above the current pixel is set as the pixel with the foregoing coordinate $X_{target}$.

In decision step 1125, a check is made if the colour matches. That is, step 1125 checks whether the current and target pixels have the same colour. If the pixels do not have the same colour (No), processing continues at step 1130. The target pixel is rejected as a candidate for extending an edge upwards. In step 1130, the x position of the target pixel $X_{target}$ is incremented, i.e., moved one x position to the right. The next pixel in the range is selected. In decision step 1140, a check is made if $X_{target}$ is equal to $X_{rangelimit}+1$. Step 1140 establishes whether or not the target pixel is still in the valid range, as limited by $X_{rangelimit}$. If step 1140 returns false (No), processing continues at decision step 1125. The colour and edge checks continue (at steps 1125 and 1127, respectively) on this and remaining target pixels, until $X_{rangelimit}$ is reached. Otherwise, if step 1140 returns true (Yes), processing continues at step 1150. At step 1150, the StartOfEdge boolean for the current pixel is set to true to indicate that the current pixel is not part of an edge extending down from the previous scanline.

If the colours do match (Yes) in step 1125, the method proceeds to step 1126. In step 1126, a determination is made if linking the current and target pixels will cross edges. This further check is made using the method of FIG. 8 to ensure that joining the current and target pixels does not cause crossed edges to be created. At decision step 1127, a check is made using the result of step 1126 if an edge is crossed. If no crossed edges are detected (No), the pixels are considered to be on the same edge and processing ends. This means that the current pixel is not a start of edge, so the StartOfEdge boolean for the pixel remains at its default value of false at routine end. Otherwise, if step 1127 returns true (Yes), processing continues at step 1130.

Referring to FIG. 10, after step 1040 has completed checking for the start of an edge, the method proceeds to step 1060. In step 1060, the likely edge linkage direction, if any, is recorded. After step 1060, processing ends. Step 1060 examines a range of pixels directly below the current pixel to determine the likely direction of the edge onto the scanline below the current pixel. Step 1060 is described in greater detail with reference to FIG. 13. This routine creates information as to the probable direction of the edge onto the scanline below and results in values being set for the current pixel in the pixel data array. These values include two booleans, MayExtendLeft and MayExtendRight, which, when set, indicate that the edge may link onto the next (subsequent) scanline to some as yet undetermined pixel to the left or right, respectively. The pixel data array also holds a value Delta, which is only used when both MayExtendLeft and MayExtendRight are false. As the edge moves down to the subsequent scanline, Delta expresses the change in x value and indicates the exact x offset into the following scanline for the continuing edge. Subsequent routines first test for the values of MayExtendLeft and MayExtendRight, and if (and only if) both are false, use Delta.

Figure 13:
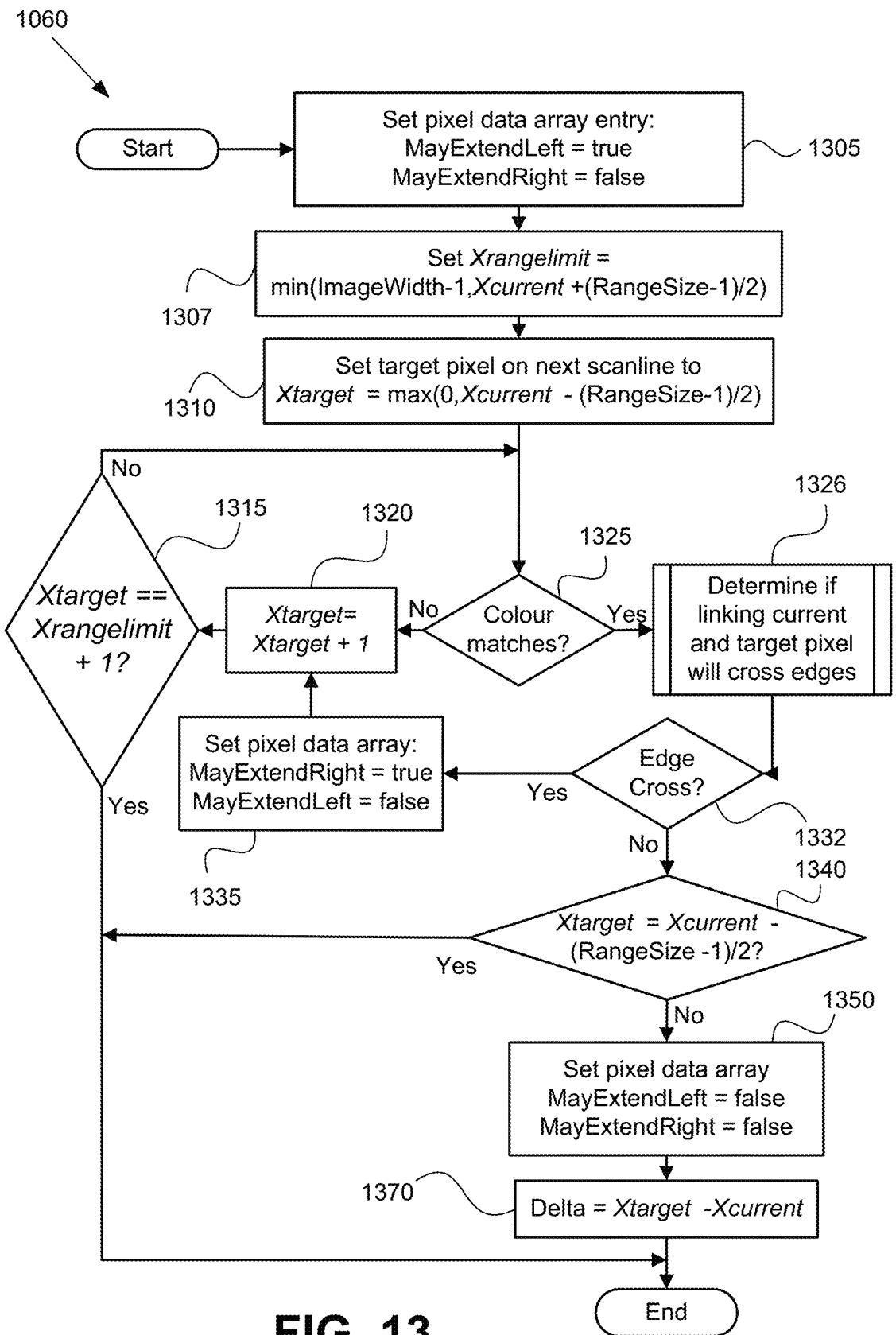
FIG. 13 is a schematic flow diagram illustrating a process of establishing an edge linkage direction.

The use of foregoing values is discussed with reference to FIGS. 12A-12F. FIGS. 12A-12F show a selection of image fragments 1205, 1210, 1215, 1220, 1225 and 1230, in which for the purpose of illustration pixels have one of two colours, A and B. In each image fragment 1205, 1210, 1215, 1220, 1225 and 1230, the pixels in positions 1203, 1208, 1213, 1218, 1223, and 1235, respectively, are the current pixels. The routine 1060 in FIG. 13 is trying to establish what link can be made between the current pixel and one of the three target pixels in the scanline below. For this discussion, a RangeSize of three is assumed. In image 1205, there are no target pixels in the range with the same colour as the current pixel, and so routine 1060 sets MayExtendLeft to true to indicate that there may be a linking pixel off to the left, beyond the range of target pixels. Prioritising is required to determine which edge should dominate, thereby avoiding edge crossings as per the above definition. An absence of preference (either to left or right) increases an edge crossing count. In the preferred embodiment, forming edges to the left is prioritised to reduce the likelihood of edge crossings. MayExtendRight is set to false. In image 1210, there is a similar result, as the linking edge may still be off to the left. In image 1215, however, there is a clear and unambiguous linking pixel, and so the MayExtendLeft and MayExtendRight flags are set to false, while Delta is set to 0 to indicate the difference in x value between the current pixel and matching target pixel. Similarly, in image 1220, MayExtendLeft and MayExtendRight flags are set to false and Delta is set to 1. In image 1225, routine 1060 attempts to link the current pixel at 1223 with the pixel at 1227, however this fails due to another edge crossing between pixels 1226 and 1228. In this case, the routine sets MayExtendLeft to false as the edge cannot be further left. There are no other pixels matching the current pixel, so MayExtendRight is set true to indicate that the edge may join further to the right. Finally, in 1230, the situation is the same as with image 1225, except that a matching target pixel link to 1237 is found at after the failed link to 1236, and Delta is set to 1.

FIG. 13 illustrates the edge linking routine 1060 performed in the routine 625 of FIG. 10. The current pixel is the currently active pixel, and $X_{current}$ refers to x value of the currently active pixel on its scanline. The target pixel refers to a pixel in the scanline below the current pixel. This target pixel is the one currently being examined as a possible candidate for extending the edge onto the scanline below.

Processing commence at step 1305. In step 1305, the pixel data array entry for the current pixel is set: MayExtendLeft=true and MayExtendRight=false. Thus, the entry in the pixel data array for the current pixel is initialised. The MayExtendLeft and MayExtendRight booleans are initially set to true and false, respectively, to indicate the default assumptions of how the edge links to the next scanline. In step 1307, $X_{rangelimit}$ is set equal to min(ImageWidth−1, $X_{current}$+(RangeSize−1)/2). Step 1307 establishes the highest target x value to be checked. This sets the maximum of the x range as being the current location x value plus (RangeSize−1)/2, or the right side of the image, whichever is lesser. In step 1310, the target pixel on the next (subsequent) scanline is set to $X_{target}$=max(0, $X_{current}$−(RangeSize−1)/2). Step 1310 sets the first target pixel location in the scanline below to the pixel at coordinate $X_{target}$.

In decision step 1325, a check is made to determine if the colour matches, i.e. the current and target pixels have the same colour. If the pixels do not have the same colour (No), processing continues at step 1320 where $X_{target}$ is incremented. The target pixel is rejected as a candidate for extending the edge downwards, and the next pixel in the range is selected in step 1320.

However, if the current and target pixels have the same colour (Yes) at step 1325, the method 1060 proceeds to step 1326, In step 1326, a determination is made if linking the current and target pixels crosses an edge(s). That is, a further check is made to ensure that joining the current and target pixels does not cause crossed edges. Step 1326 is identical to step 1126, as explained hereinbefore in relation to FIG. 11. In decision step 1332, a check is made if an edge is crossed. If step 1332 determines no crossed edges are detected (No), processing continues at step 1340. The pixels determined to have matching colour at step 1325 are considered joined on a common edge, and the settings for MayExtendLeft, MayExtendRight and Delta are set appropriately. In this case, the method proceeds to decision step 1340. In step 1340, a check is made to determine if $X_{target}=X_{current}-(RangeSize-1)/2$. This determines whether the matching target pixel is at the left-most limit of the range. If so (Yes), the default settings (from step 1305) of MayExtendRight (false) and MayExtendLeft (left) stand. This indicates that for this match at the extreme left of the range, the edge either links at this extreme left pixel, or at another even further left. Processing then continues at decision step 1315. However, if step 1340 returns false (no) indicating the matching target pixel is anywhere else in the range apart from extreme left, processing continues at step 1350. In step 1350, the pixel data array is set, so that both MayExtendLeft and MayExtendRight are false. In step 1370, Delta is set equal to $X_{target}-X_{current}$. That is, Delta is established as the difference in x value between target and current pixels, and the routine ends.

Referring again to step 1332, if step 1332 returns true (Yes), processing continues at step 1335. This is the case of a failed match between the current and target pixels, if the failure is due to an edge cross, as detected at step 1332. In step 1335, the pixel data array is set, so that MayExtendLeft is false and MayExtendRight is true. This is because the edge cross check step 1332 has established that another edge exists that stops this edge from extending to the left. For the case of failure by either colour mismatch (determined at step 1325) or crossed edges (determined at step 1332), the next target pixel is selected by incrementing the $X_{target}$ value at step 1320. In decision step 1315, a check is made to determine if $X_{target}$ is equal to $X_{rangelimit}+1$. This establishes whether the target pixel is still in the valid range, as limited by $X_{rangelimit}$. If step 1315 returns false (No), processing continues at step 1325, and the colour and edge checks continue (at steps 1325 and 1332, respectively), on this and the other target pixels in the range, until $X_{rangelimit}$ is reached. However, if step 1315 determines that $X_{rangelimit}$ has been reached without finding a match (Yes), the routine 1060 ends. If no target pixels were found for linkage downwards, the routine returns the default MayExtendRight set to false and MayExtendLeft set to true.

By the end of the pixel status gathering routine 410, the pixel data array entries for each of the identified edge pixels is populated with information pertaining to the pixel's immediate neighbourhood. This information is used in later phases to link the edge pixels together into edges.

Figure 14A:
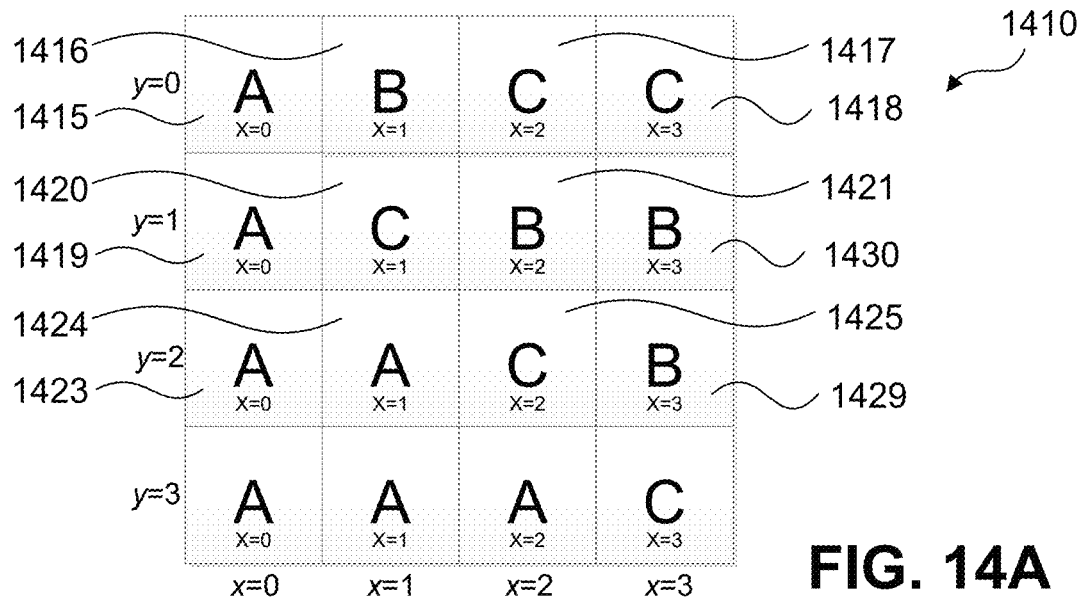
FIGS. 14A and 14B are block diagrams showing a worked example of edge status collection calculation.
Figure 14B:
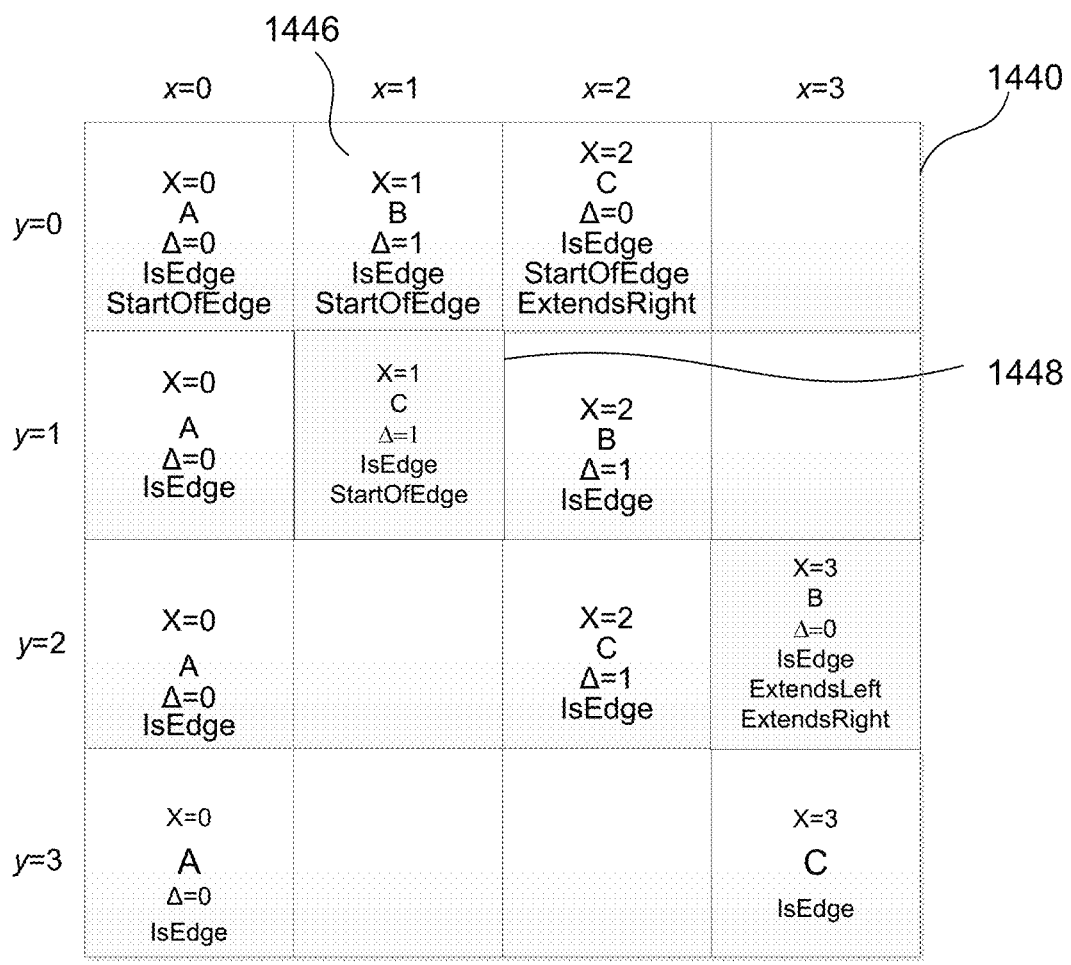

FIGS. 14A and 14B show a worked example of the pixel status gathering routine 410. The input in this example is a 4×4 sample image 1410, where three different colours are represented by the letters A, B and C. x positions are marked on the pixels in the figure. The pixel data array for this image is shown in 1440. The status collection procedure is demonstrated for two pixels 1416 and 1420.

Firstly, the operation of pixel status gathering routine 410 for pixel 1416 is described. Working from step 615, step 410 includes performing step 620 of FIG. 6 for each pixel in parallel across the cores in a GPU. Step 620 establishes the pixel's edge status and is described above with reference to FIG. 9. In FIG. 9, step 905 sets IsEdge to false and step 910 confirms that this is not a pixel on the image's left edge. Step 920 establishes that pixel 1416 has a differing colour to the pixel immediately to its left, pixel 1415, and therefore is classified as an edge pixel. Accordingly, the following step 930 sets the IsEdge entry in the pixel data array entry for pixel 1446 to true.

Continuing with step 625 into FIG. 10, step 1020 confirms that this is an edge pixel. Step 1040 determines if pixel 1416 starts an edge by checking the row above for possible links, as detailed in FIG. 11. At step 1105, the StartOfEdge flag for the current pixel is reset. At step 1108, a check is made to see if the pixel is at the top of the image. In the case of pixel 1416, this is the case, so the StartOfEdge flag sets at step 1150 in the pixel data array for this pixel 1446.

Returning to FIG. 10, at step 1060 the edge link direction onto the row below has to be established. This routine 1060 is shown in more detail in FIG. 13. At the next step 1305, the boolean values MayExtendLeft and MayExtendRight are set to true and false, respectively, in the corresponding entry in the pixel data array 1446. At the next step 1307, $X_{rangelimit}$ is set as min(ImageWidth−1, $X_{current}+(RangeSize-1)/2)$. As explained earlier, RangeSize is hardware dependent. As explained above, RangeSize is the reach in memory after which cache misses are inevitable. Assuming a RangeSize of three, this sets $X_{rangelimit}$ as $1+(3-1)/2=2$. This indicates that the pixel 1421 on the next scanline (y=1) with an x value of 2 is the last pixel (ie with the highest x value) in the range being checked for edge link direction. At the next step 1310, the first target pixel x location is set as $X_{target}=\max(0, X_{current}-(RangeSize-1)/2)=1-(3-1)/2=0$, so the first pixel to be checked is at position (0,1) 1419. At the next step 1325, the colour of this target pixel 1419 is compared with the colour of the current pixel 1416. In this example, the colours do not match, so at step 1320, the next pixel with increasing x is selected, i.e. pixel 1420. Again at step 1325, the colour of this pixel 1420 is found to not match the colour of the current pixel 1416, so at step 1320 the next pixel with increasing x is selected at step, i.e. pixel 1421. At step 1325, target pixels 1416 and current pixels 1421 do indeed match colour, so at step 1326 an edge cross check is made. Moving to FIG. 8 for this check, step 810 sets the range of check pixels to be just the pixel 1415. Step 815 confirms that pixel to be in range, and step 820 sets the bottom range as just pixel 1430. Step 830 confirms that pixel to be in range, so step 835 compares colours between 1415 and 1430 and finds the colours are different. Steps 830 and 815 confirms that both top and bottom ranges are exhausted, and so the routine confirms at step 845 that there are no crosses for this link.

Returning to FIG. 13, the following step 1332 confirms that there is no edge crossing, so the method proceeds to step 1340. At this point the link is confirmed, but must be quantified. Step 1340 determines that the target pixel is not at the extreme left of the range, i.e. that the target pixel 1421 at x=2 is not at the same x as the extreme left pixel of the range 1419 at x=0. Processing therefore continues at step 1350 where MayExtendLeft and MayExtendRight are both set to false. At step 1370, Delta is set in the pixel data array 1446 as $(X_{target}-X_{current})$, i.e. 2−1=1. As explained, this Delta value of 1 represents the change in x value as the edge moves down from one row to the next.

This completes the pixel status gathering routine 410 for pixel 1416.

For the next example, pixel 1420 is used as the current pixel. Step 620 begins to establish the pixel's edge status. In FIG. 9, step 905 sets IsEdge to false and step 910 confirms that this is not a pixel on the image's left edge. Step 920 establishes that pixel 1420 has a differing colour to the pixel immediately to its left, pixel 1419, and therefore is classified as an edge pixel. Accordingly, the following step 930 sets the IsEdge entry in the pixel data array entry for pixel 1450 to true.

Step 1040 determines if pixel 1420 starts an edge by checking the row above for possible links, as detailed in FIG. 11. At step 1105, the StartofEdge flag for the current pixel is reset. At step 1108, a check is made to determine if the pixel is at the top of the image ($Y_{current}$=0). The pixel 1420 is not, so the routine analyses the pixels in the row above the current pixel 1420 to see if a link is possible. At step 1110, $X_{rangelimit}$ is set to min(ImageWidth−1, $X_{current}$+ (RangeSize−1)/2). With an imageWidth of 4 pixels, and assuming a RangeSize of three, this sets $X_{rangelimit}$ to 2(1+ (3−1)/2). Step 1120 sets the first target pixel as max (0, ($X_{current}$−(3−1)/2)), i.e. 1−1=0, i.e. the pixel at (0,0) 1415. At step 1125, the colour of this target pixel 1415 is compared with the colour of the current pixel 1420 to determine if the colours match. The colours do not match, so at step 1130, the next pixel 1416 with increasing x is selected, i.e. $X_{target}$=1. At step 1125, the colour of this target pixel 1416 is compared with the colour of the current pixel 1420. The colours do not match, so at step 1130, the next pixel 1417 with increasing x is selected, i.e. $X_{target}$=2. At step 1125, the colour of this target pixel 1417 is compared with the colour of the current pixel 1420. These pixels do match colour.

Step 1126 performs a cross check. Moving to FIG. 8 for the cross check, step 810 establishes the top range of pixels to be checked. Assuming a RangeSize of 3, HalfRange is established as 1. xNextTop is set as the x of pixel 1417− HalfRange i.e. 2−1=1 i.e. pixel 1416, and xFinalTop as xTop−1=2−1=1 i.e. also pixel 1416. At step 815, XNextTop is not greater than xFinalTop, so at step 820 the bottom range of pixels is set for checking. xNextBottom is set as Xbottom+1, i.e. the x of pixel 1420+1=1+1=2 i.e. pixel 1421. xFinalBottom is set as xBottom+HalfRange=1+1=2, i.e. also pixel 1421. Step 830 establishes that the lower range has not yet been exhausted, and so at step 835 a colour check is made between the pixels at (xNextTop, yTop) and (xNextBottom, yBottom) i.e. pixels (1,0) 1416 and (2,1) 1421. Step 835 establishes that these pixels have the same colour, and so the routine signals at step 850 that a cross has been found, and exits. Returning to FIG. 11, Step 1127 establishes an edge crossing exists and rejects the target pixel as a possible edge link. At step 1130, the next pixel with increasing x is selected, i.e. $X_{target}$=3. At Step 1140, the $X_{target}$ value of 3 is now equal to $X_{rangelimit}$ (currently 2)+1. Step 1150 sets StartofEdge to the pixel data array value 1448, so this current pixel is marked as being the start of an edge. This reflects that no pixel has been found in the row above this one that could link to the current pixel as an edge.

Returning to FIG. 9, at step 1060 the edge link down to the row below has to be established. This routine 1060 is shown in FIG. 13. At step 1305, the boolean values MayExtendLeft and MayExtendRight are set to true and false respectively in the corresponding entry in the pixel data array 1448. At step 1307, $X_{rangelimit}$ is set as min(ImageWidth−1, $X_{current}$+(RangeSize−1)/2). Assuming a RangeSize of three, this sets $X_{rangelimit}$ as 1+((3−1)/2=2. This indicates that the pixel 1425 on the next scanline (y=2) with an x value of 2 is the last pixel (highest x) in the range to check for edge link direction. At step 1310, the first target pixel x location is set as =$X_{target}$=max(0, $X_{current}$−(RangeSize−1)/2)=1−(3−1)/2)=0, so the first pixel to be checked is at position (0,2) 1423. At step 1325, the colour of this target pixel 1423 is compared with the colour of the current pixel 1420. These colours do not match, so at step 1320, the next pixel with increasing x is selected, i.e. pixel 1424. Again, at step 1325 determines that these colours do not match, so at step 1320 the next pixel with increasing x is selected, i.e. pixel 1425. Step 1325 determines that these pixels do indeed match colour, so an edge cross check is made at step 1326 between current pixel 1420 and target pixel 1425. Moving to FIG. 8 for this check, step 810 sets the top range of check pixels to be the pixel 1419. Step 815 confirms that pixel to be in range, and step 820 sets the bottom range as just pixel 1429. Step 830 confirms that pixel to be in range, so step 835 compares colours between 1419 and 1429 and finds them different. Steps 830 and 815 confirm that both top and bottom ranges are exhausted, and so the routine confirms at step 845 that there are no crosses for this link. The link between the pixels 1420 and 1425 is established.

Returning to FIG. 13, after step 1332 determines that there is no edge cross, step 1340 checks if the target pixel is at the extreme left value of the range. The target pixel is not, so at step 1350, MayExtendLeft and MayExtendRight are both set false. At step 1370, Delta is set as ($X_{target}$−$X_{current}$), i.e. 2−1=1. This indicates that the value of x changed by 1 as the edge moved from one row to the next.

The other pixels in the example image 1410 are processed in a similar way.

The pixel status gathering routine 410 results are shown in pixel data array 1440 with the identified pixel edges shown, together with their IsEdge, StartofEdge, MayExtendLeft, MayExtendRight flags (when set to true) and the Delta to the next pixel in their edge. For clarity, the values of the non-edge pixel locations are not shown, as are false StartOfEdge, MayExtendLeft and MayExtendRight flags.

Figure 15:
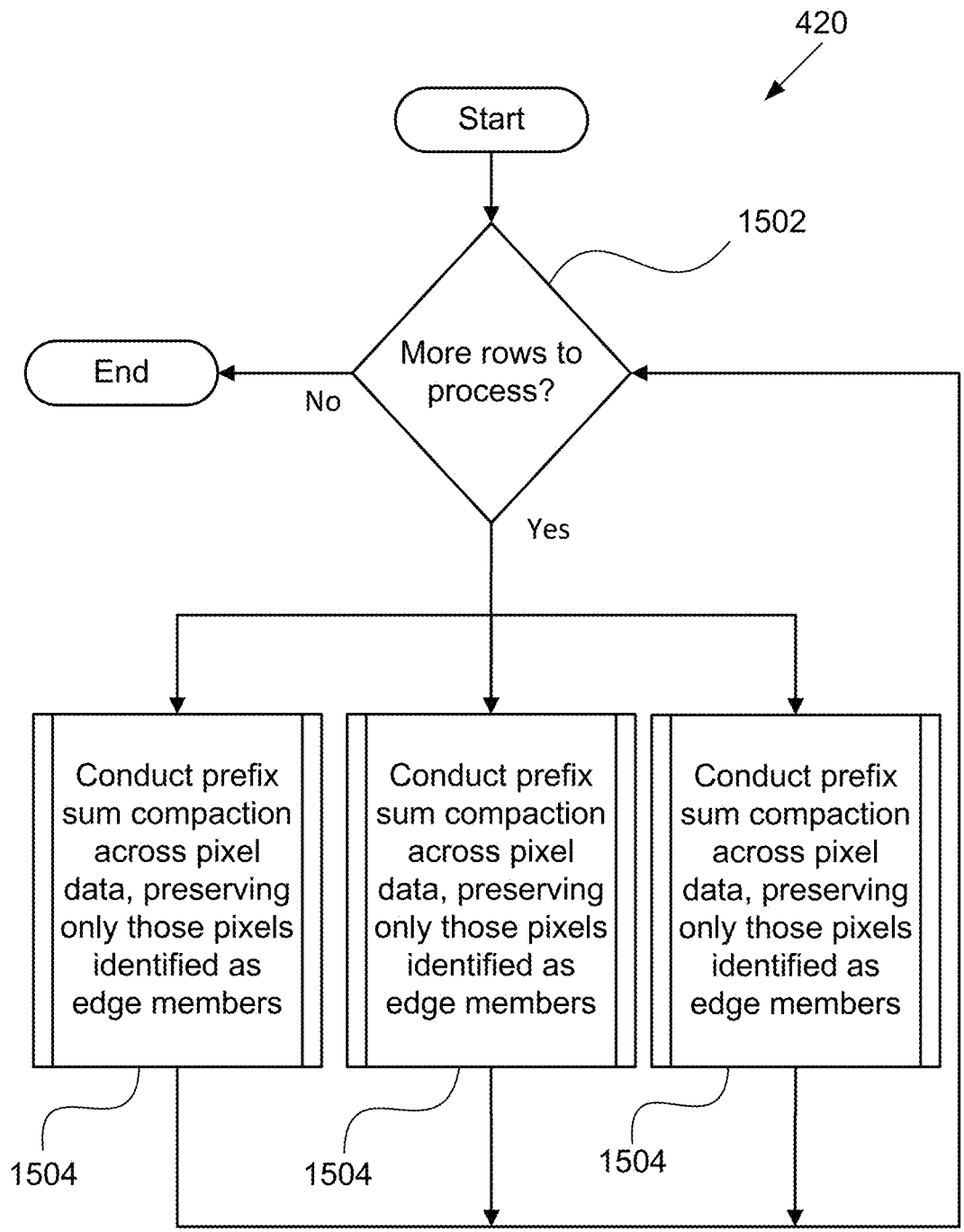
FIG. 15 is a schematic flow diagram providing an overview of the parallelism of the process of compacting edge pixels.

Returning to FIG. 4, once the status of all of the image pixels have been processed as part of the pixel status gathering routine 410, the routine 400 moves to the compaction routine 420, which is shown in more detail in FIG. 15. This routine 420 involves pixel data array rows being selected and compacted in parallel. Processing starts at step 1502. In step 1502, a check is made to determine if there are more rows to process. Step 1502 establishes whether there are more pixel data rows to be compacted. If step 1502 returns false (No), processing ends. However, if step 1502 returns true (Yes), processing continues at step 1504 (three parallel paths or branches in FIG. 15). In step 1504, a prefix sum compaction is conducted across pixel data, preserving those pixels identified as edges. At step 1504, each row from the pixel data array is subjected to a prefix sum compaction, each row in parallel. Within each row, a number of threads are allocated, and a prefix sum compaction is run in parallel using the threads. This compaction uses the IsEdge flag (as generated in the pixel status gathering routine 410) to identify the pixel data that is to be preserved and compacted to the left of the row. A prefix sum compaction is used, as this technique is the most efficient algorithm for such compaction in a massively parallel context such as GPUs. From step 1504, processing continues at step 1502. At step 1502, the compaction routine 420 ends when no more rows are available to process.

Figure 16A:
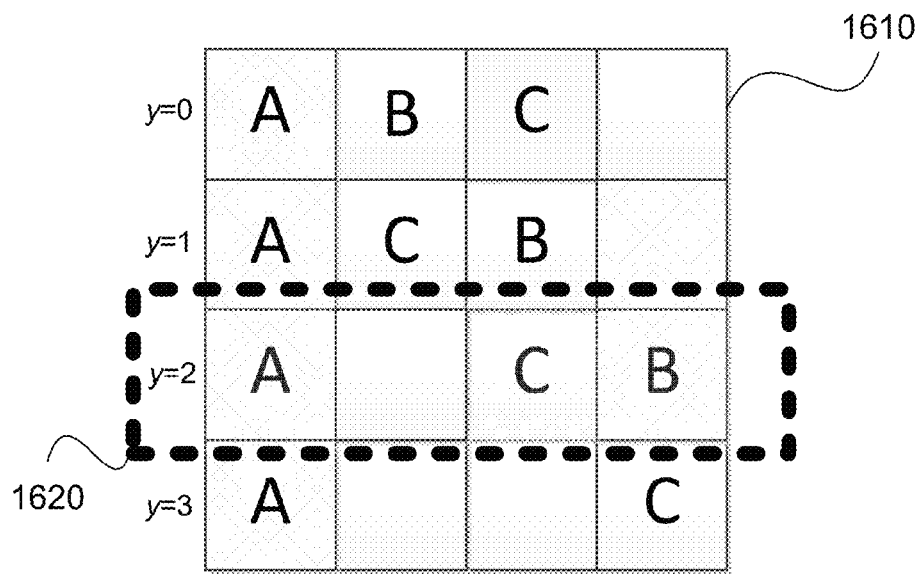
FIGS. 16A and 16B form a block diagram showing a worked example of scanline compaction using the process of FIG. 15.
Figure 16B:
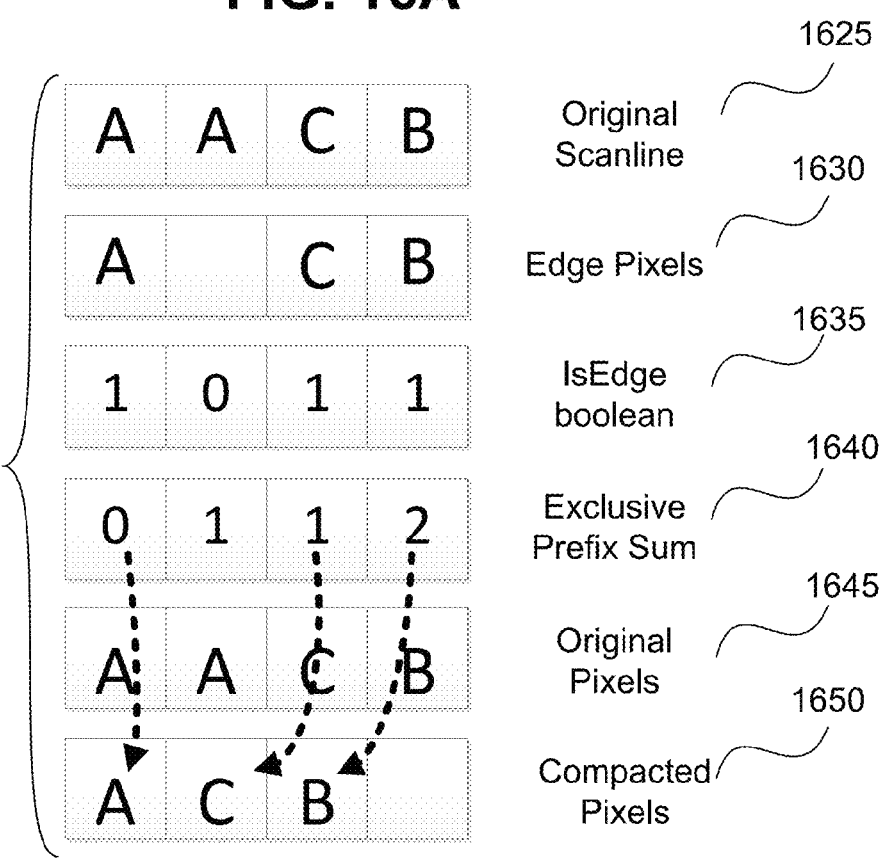

The operation of a prefix sum to effect a compaction is described by way of an example with reference to FIGS. 16A to 16E. FIGS. 16A and 16B illustrate an example of compaction using a prefix sum method, using the pixel data array 1440 of FIG. 14 as source data, shown simplified at 1610 in FIG. 16A. Note that for brevity, only the edge pixels are shown and these are identified only by their colour. Scanline fragment 1620 of FIG. 16A is used to illustrate the compaction process. Starting with scanline 1625 corresponding to scanline y=2 of source image 1410, step 410 finds edge pixels as shown in scanline 1630 of pixel data array 1440. The edge pixels are identified by an IsEdge boolean value of true in the pixel data array 1440. The IsEdge flags in the pixel data array for scanline y=2 are illustrated in scanline 1635, where true and false are shown as 1 and 0, respectively. Using these booleans as input to an exclusive prefix sum with addition as the binary operator yields series 1640. For an input sequence $x_0$, $x_1$, . . . , this prefix sum yields an output series $s_i = \Sigma_{j=0}^{i-1} x_j$, which in the preferred embodiment can be efficiently evaluated taking advantage of parallel processing available on a GPU using methods known in the art. The IsEdge boolean values 1635 are used as an input for an additive exclusive prefix sum, and the results are stored in 1640. Any edge pixel from 1645 is copied to the compacted pixel array 1650 using the array address in the matching exclusive sum position 1640. Thus, if IsEdge for pixel data entry $x_i$ is true, all the pixel data (see FIG. 5) is copied to compacted pixel data compacted array element $s_i$ (although in this example only colour is shown being copied). In the preferred embodiment, the copying step is also performed in parallel using a GPU, as well as performing the prefix sum. This compaction phase serves two significant roles. The compaction performs compression in the x direction. However, the compaction also allows the efficient edge creation process in the y direction in massively parallel environments such as GPUs, which is not efficient if the original pixel field is used directly without compaction. The GPU is linking edge pixels together, but these pixels need to be as close as possible to avoid broken edges, and the compaction process maximises this proximity.

Figure 16C:
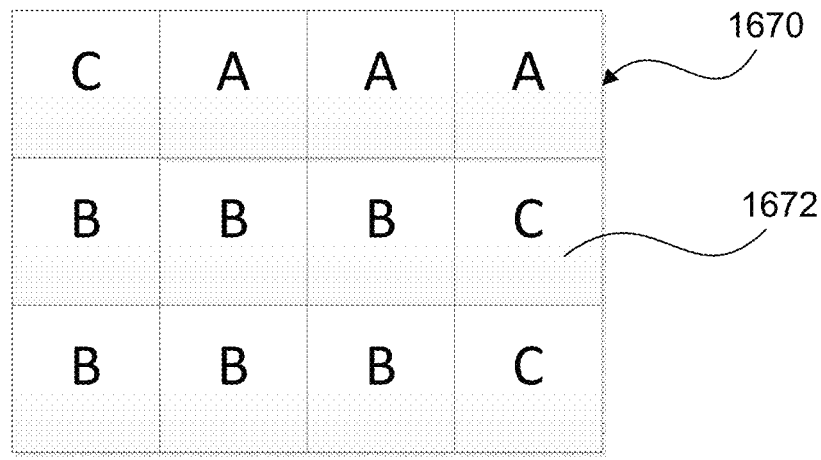
FIGS. 16C to 16E show another compaction example, to illustrate its advantages.
Figure 16D:
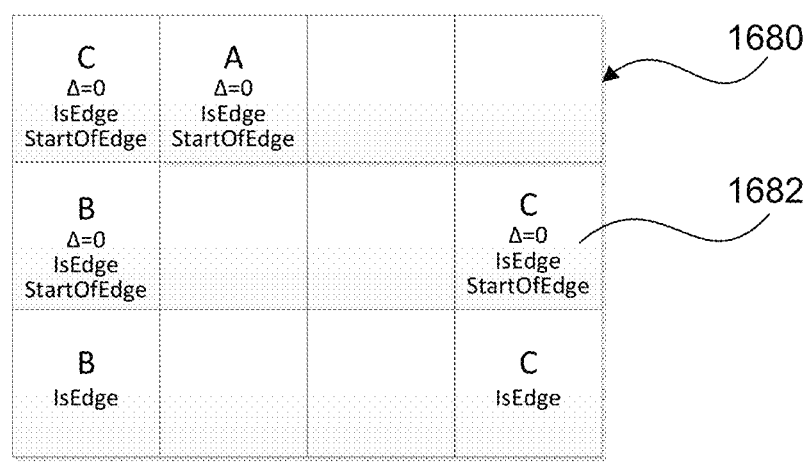
Figure 16E:
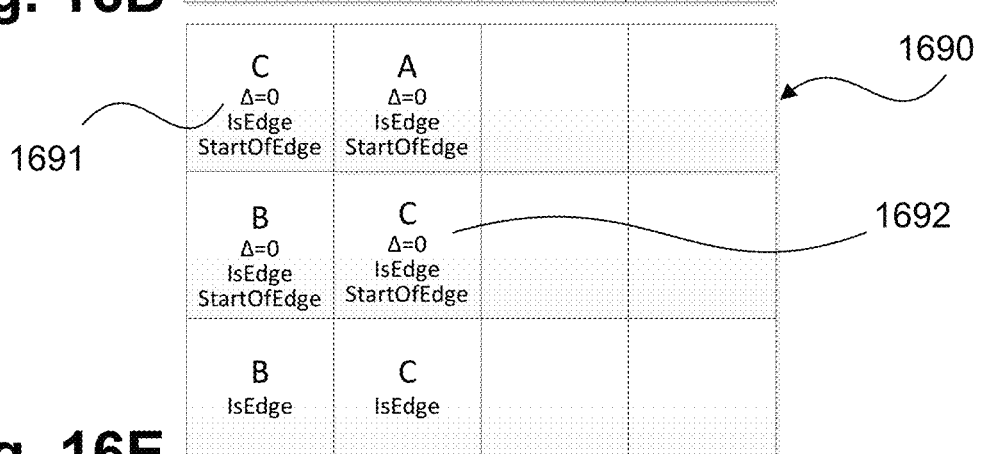

FIGS. 16C to 16E present an example to clarify the usefulness of this compaction step. The pixels in image 1670 are processed through routine 410 to create pixel data array 1680, which is compacted in step 420 to form the compacted pixel data array 1690. For pixel 1672, there are no like coloured pixels that are both in the row above and within range, and so the pixel data array entry 1682 describes the pixel 1672 as StartOfEdge. Without compaction, the edge creation routine (described hereinafter) forms two edges, beginning from pixels 1691 and 1692. However, ideally the edge creation routine forms a single edge, beginning from pixel 1691 and including pixel 1692. Compaction allows the GPU to link the two pixels 1691 and 1692, as compaction brings the two pixels 1691 and 1692 in close proximity in GPU cached memory (as attached to the pixel data array's texture memory).

Figure 17A:
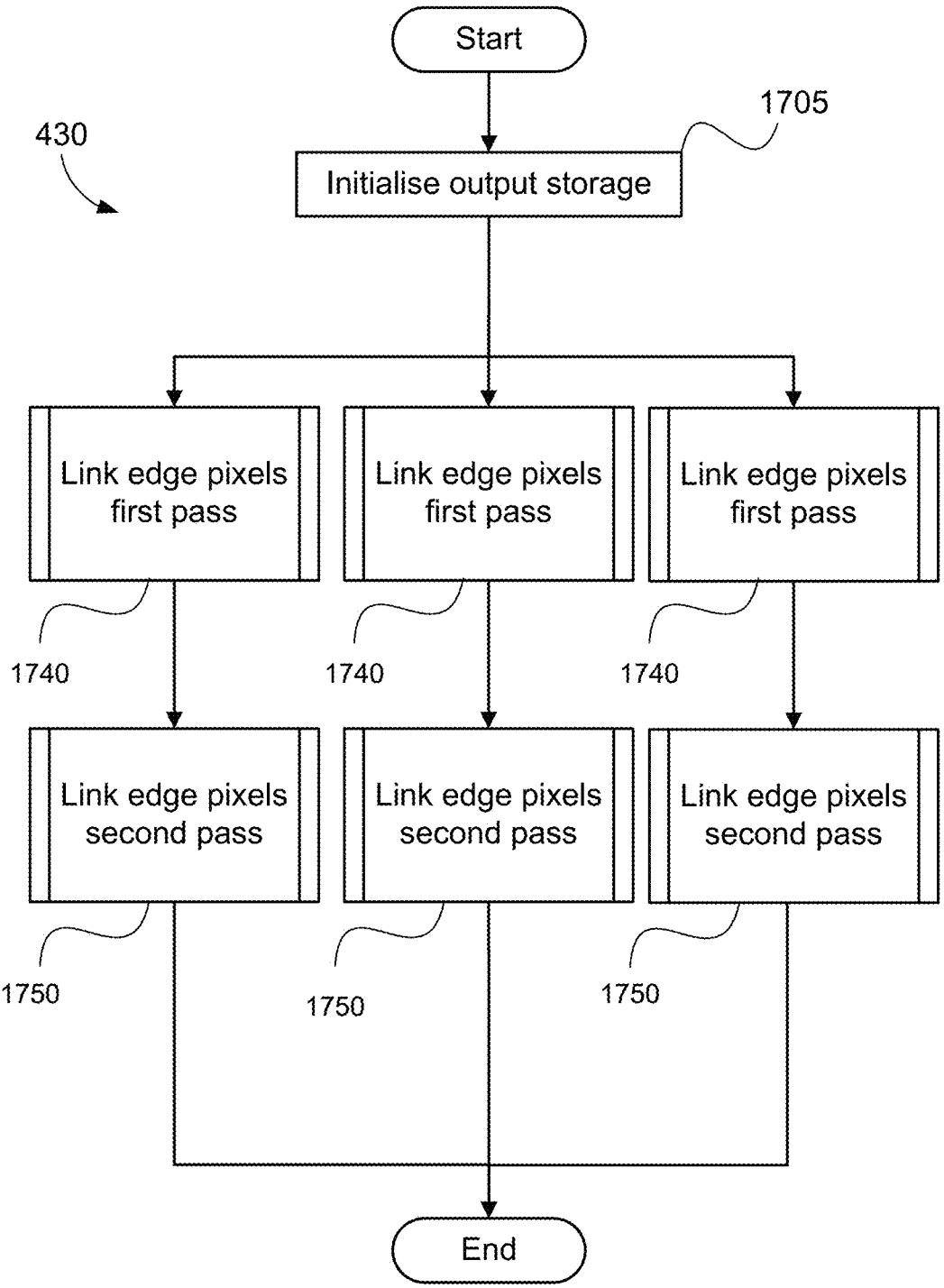
FIG. 17A is a schematic flow diagram providing an overview of the parallelism of the process of reading edges from the compacted data structure.

After the compaction phase 420 is completed, the compression routine 400 proceeds to the edge reading routine 430, which is shown in more detail in FIG. 17A. This routine 430 uses the information gathered earlier 620 for each pixel. The information is used to link together the edge pixels into complete edges.

Note that the term 'compacted array position' in the following discussions refers the two dimensional position within the compacted pixel data array. Similarly, 'compacted array element' refers to the actual data element within the compacted pixel data array. The term 'pixel' in FIGS. 18-25 also refers to the data element in the pixel data array.

FIG. 17A shows in detail the edge reading routine 430 of FIG. 4. Processing commences at step 1705. In step 1705, output storage is allocated and initialised for the edges that are about to be generated. This routine 430 uses as its source the compacted pixel data arrays already generated. At steps 1740 and 1750, the routine 430 moves in two passes across the pixel data array. Both passes look in parallel at every entry in the pixel data array, one GPU thread per pixel, to establish whether that entry is the start of an edge. If the entry is the start of an edge, the routine establishes which compacted array elements should join together from that point onwards, to form a complete edge. As shown in FIG. 17A, from step 1705, three parallel paths/branches each comprise steps 1740 and 1750, before processing ends. In step 1740, edge pixels are linked in a first pass. The first pass 1740 establishes almost all the available edges. However, this first pass may miss edges that are broken by more than Range value of the GPU. In step 1750, edge pixels are linked in a second pass. The second pass 1750 is needed to collect the missed edges. This is described in more detail in later sections. Edges start from the edge start pixel and extend downwards, although another implementation may work upwards just as readily.

Each pass starts with a pixel entry that has been identified as an edge start. The GPU thread assigned to that pixel operates to link together that pixel entry with other below to form an edge. Each thread doing this linkage operates in parallel as the threads build their own edge and eventually write the complete edge to output storage. From step 1750, processing ends in FIG. 17A.

Figure 18:
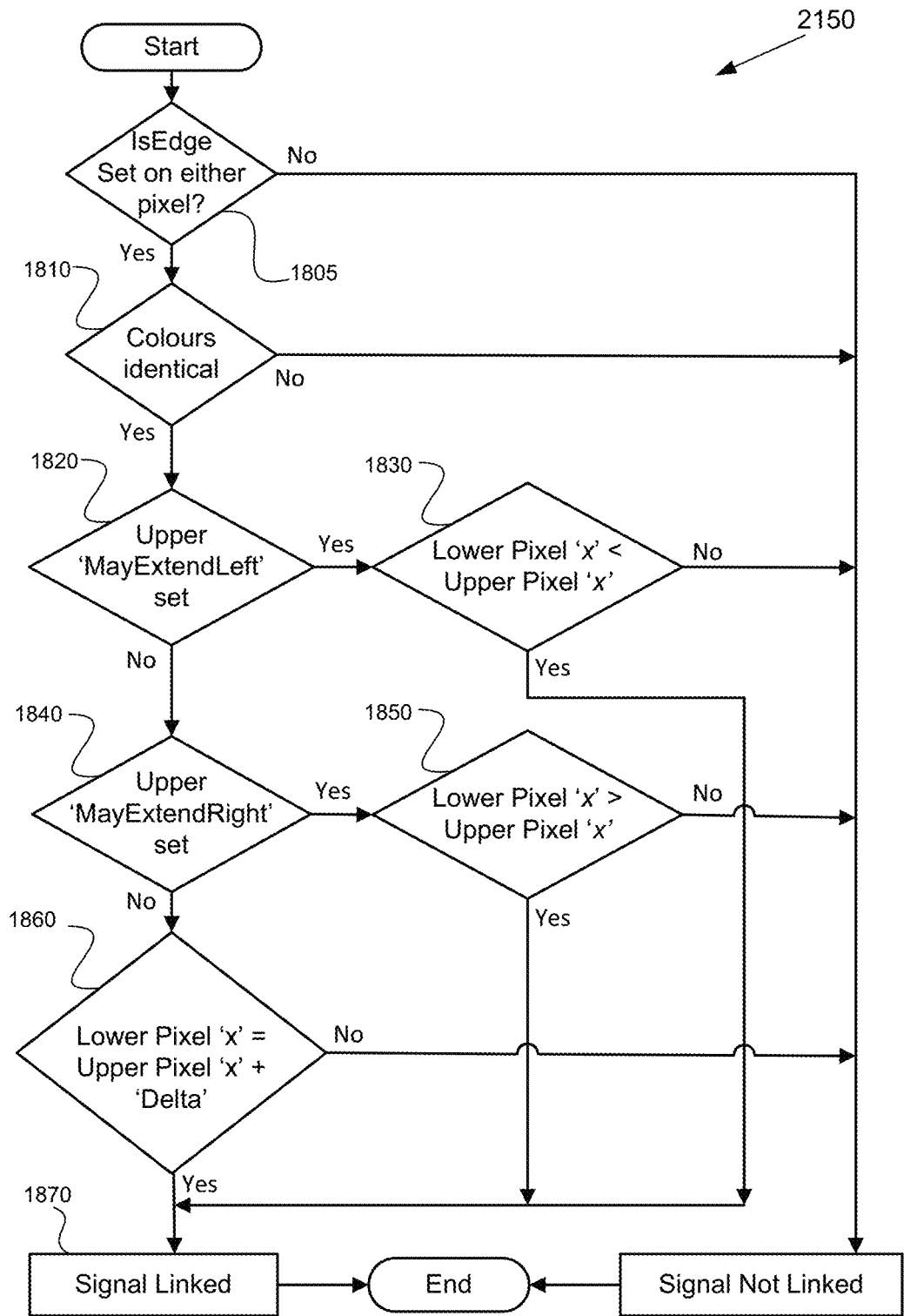
FIG. 18 is a schematic flow diagram illustrating a process of identifying linking edge pixels on consecutive scanlines.

At various points in the following routines, a decision is made as to whether two compacted array elements on consecutive rows are part of a common edge. This decision is based on the neighbourhood information stored for each compacted array element in the pixel data array, as gathered in FIGS. 9 and 10. FIG. 18 shows the process 2150 of deciding whether two compacted array elements on consecutive scanlines link together to form an edge. The compacted array element on the scanline with the smallest y-value (referenced from the image top) is called the upper compacted array element, and the compacted array element on the following scanline with the largest y-value is called the lower compacted array element. As discussed hereinbefore, this linking process is only from one line to the next, either up or down one line.

Processing commences at step 1805 in FIG. 18. In decision step 1805, a check is made to determine if IsEdge is set on either pixel. Step 1805 is performed to ensure that both compacted array elements are indeed edge elements. This step is necessary as the compacted pixel data array still retains non-edge compacted array elements on the right of each line. If step 1805 determines that either element is not an edge element (No), processing continues at step 1880, where the routine signals that the compacted array elements do not connect. Processing then ends. If decision step 1805 returns true (Yes), processing continues at step 1810. In decision step 1810, a check is made to determine if the colours are identical. If the colours differ between the lower compacted array element and upper compacted array elements, processing continues at step 1880, which signals that the edges are not linked (do not connect). If decision step 1810 returns true (Yes), processing continues at step 1820.

In step 1820, a check is made to determine if the upper "MayExtendLeft" boolean is set. If the upper compacted array element has MayExtendLeft set (Yes), processing continues at step 1830. In step 1830, a check is made to determine if the lower pixel x location is less than the upper pixel x location. If step 1830 returns true (Yes), processing continues at step 1870, which signals the elements are linked, before processing ends. The lower compacted array element is expected to be at some smaller x location than the upper compacted array element before the lower and upper compacted array elements are considered linked (at step 1870). Otherwise, if step 1830 returns false (No), processing continues at step 1880 to signal that the elements are not linked. If step 1820 returns false (No), processing continues at step 1840. At step 1840, a check is made to determine if the upper MayExtendRight is set. If step 1840 determines the upper compacted array element has MayExtendRight set (yes), processing continues at step 1850. At decision step 1850, a check is made to determine if the lower pixel x location is greater than the upper pixel x location. If step 1850 returns true (Yes), meaning the lower compacted array element has to be at some larger x location before compacted array elements are considered linked, processing continues at step 1870 to signal the elements are linked. Otherwise, if step 1850 returns false (No), the elements are not linked, as signalled in step 1180.

If step 1840 returns true (yes), processing continues at step 1860. At step 1860, neither MayExtendLeft nor MayExtendRight is set. In decision step 1860, a check is made to determine if the lower pixel x location is equal to the upper pixel x location+Delta. If step 1860 returns true (Yes), the lower compacted array element's x value must be equal to the upper compacted array element's x value added to the upper compacted array element's Delta value and the edge link is confirmed in step 1870. Otherwise, if step 1860 returns false, processing continues at step 1880, where the compacted array elements are signalled as not being linked (unconnected) in step 1880.

Also at various points in the routines to follow, whether a single compacted array element can link to any compacted array elements in the row below must be established. This sub-routine 1945 is detailed in FIG. 22. Processing commences at step 2205. At step 2205, a check is made to determine if there are any rows below the current compacted array element, i.e. $Y_{current}$=vertical image size-1. If there are no rows beneath the current compacted array element (No), processing continues at step 2260, where the routine signals no linkage to the row below. The process then ends. If step 2205 determines there are lines below (Yes), processing continues at step 2230. The routine 1945 arranges to check across a range of compacted array elements on the row directly beneath the current compacted array element. At step 2230, the target pixel on the next scanline is set to $X_{target}$=max(0, $X_{current}$−(RangeSize−1)/2). Thus, the first target compacted array element location in the scanline below is set as the compacted array element at $X_{target}$=max(0, $X_{current}$−(RangeSize−1)/2). Step 2232 sets $X_{rangelimit}$=min(ImageWidth−1, $X_{current}$+(RangeSize−1)/2). This step establishes the highest target x value to be checked, as $X_{rangelimit}$=min(ImageWidth−1, $X_{current}$+(RangeSize−1)/2). Processing continues at step 2235.

In decision step 2235, a check is made to determine if IsEdge is set. Step 2235 examines the compacted array element's IsEdge boolean. If step 2235 returns false (No), processing continues at step 2250. The target compacted array element is rejected as a possible edge extension to the current compacted array element. In this case, at step 2250, the next target compacted array element is selected by incrementing the x value ($X_{target}$=$X_{target}$+1). Processing continues at step 2245. In decision step 2245, a check is made to determine if $X_{target}$=$X_{rangelimit}$+1. If step 2245 returns false (No), processing continues at step 2235. Otherwise, if step 2245 returns true (Yes), processing continues at step 2260.

If IsEdge is determined to be set at step 2235 (Yes), processing continues at step 2240, which determines if the current and target compacted array elements (pixels) are linked. Step 2240 is identical to step 2150, as explained hereinbefore in relation to FIG. 18. In decision step 2252, a check is made if the pixels are linked. If at step 2252 no linkage is possible (No), processing continues at step 2250, where the next target compacted array element is also selected by incrementing the x value. If step 2252 determines that the current and target compacted array elements can link (Yes), processing continues at step 2253, a determination is made if linking the current and target pixel crosses edges. That is, a check is made to establish whether a link between current and target compacted array elements violates edge crossing rules. Step 2253 is identical to step 1126, as explained above in relation to FIG. 8. In decision step 2255, a check is made if an edge is crossed. If at step 2255 an edge cross is detected (Yes), processing continues at step 2250, where the next target compacted array element is also selected by incrementing the x value. Once the x value of the next target compacted array element is determined, in step 2245 the value is checked to ensure the value is within the $X_{rangelimit}$, as established in step 2232. If the new x value is not within the $X_{rangelimit}$ (Yes), no target compacted array elements in the range actually link with the current compacted array element, and processing continues at step 2260. Step 2260 registers that no link exists from the current compacted array element to the row beneath. However, if step 2255 returns false (No), processing continues at step 2280. That is, a target compacted array element is found that has IsEdge set (step 2235), satisfies linkage criteria (step 2252), and has no edge crossing issues (step 2255). Step 2280 signals an upward link, and the routine 1945 exits.

Figure 19:
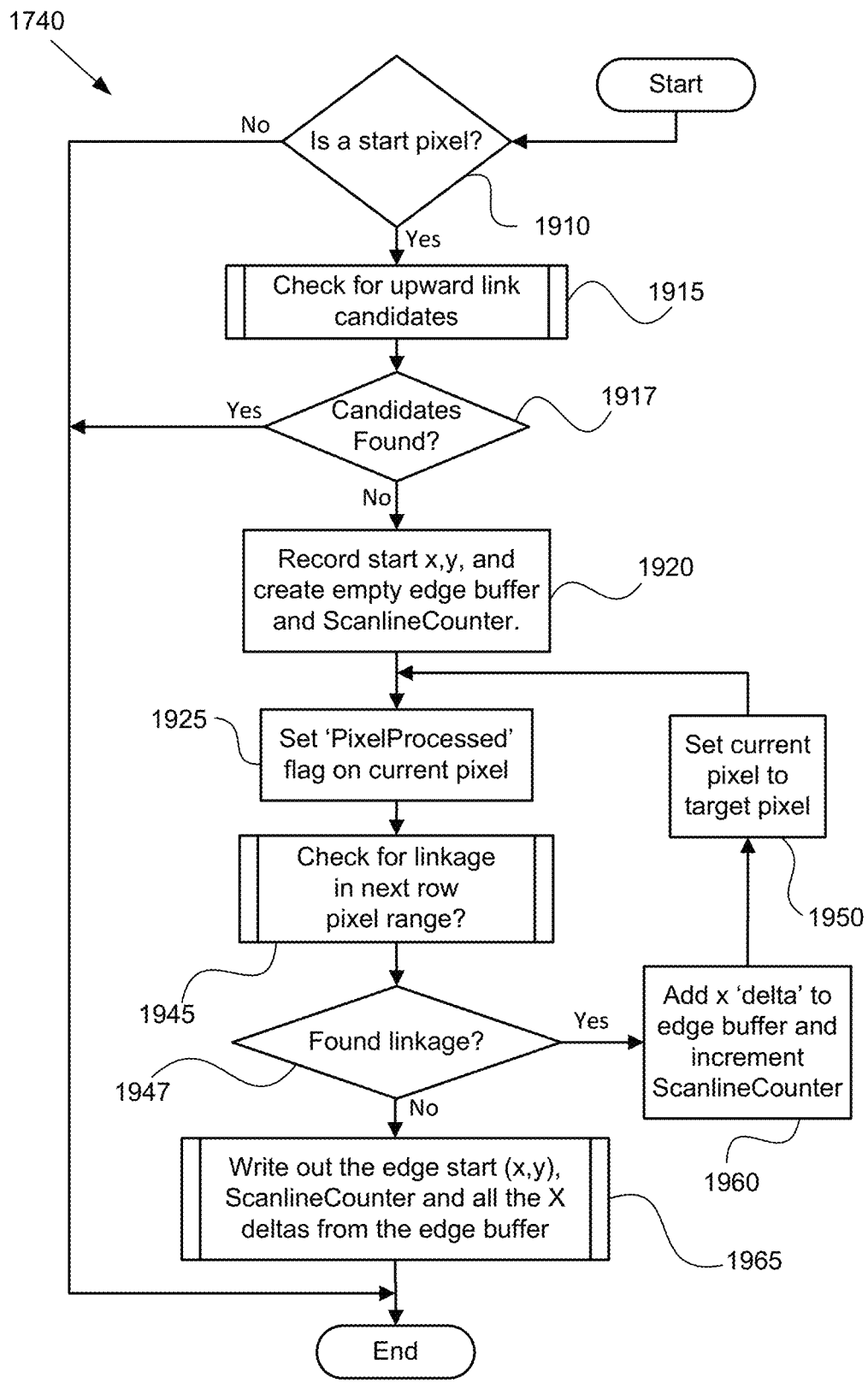
FIG. 19 is a schematic flow diagram illustrating a process of the first pass of creating individual edges from the compacted data structure.

The first pass edge reading routine 1740 is illustrated in detail in FIG. 19. As shown in FIG. 6, the routines 1740 and 1750 run as separate kernels in parallel within the GPU. The routine 140 commences processing at step 1910. In Step 1910, a check is made to determine if the entry is a start pixel. That is, the entry in the pixel data array is checked to determine if the compacted array element's entry is flagged as StartofEdge. If step 1910 returns false (No), routine 1740 ends. No edge is written If step 1910 returns true (Yes), meaning the compacted array element does start an edge, processing continues at step 1915. In step 1915, a check is made for upward link candidates. Step 1915 determines if there are any compacted array elements on the row above the compacted array element that may link down to the compacted array element. If any are found, this edge creation can be abandoned, as the kernel concerned with the upper compacted array element links down and absorbs this compacted array element and any edge below the compacted array element.

FIGS. 16C to 16E present an example to clarify the need for this upward link step 1915. As already described, the pixels in image 1670 in FIG. 16C are processed through routine 410 to create pixel data array 1680, and this is compacted in step 420 to form the compacted pixel data array 1690. For pixel 1672, there are no like coloured pixels that are both in the row above and within range, and so the corresponding pixel data array entry 1682 describes the pixel 1672 as StartOfEdge. Without step 1915, the edge creation routine would form two edges, beginning from compacted array elements 1691 and 1692, thereby decreasing the compression rate, which is not desirable. However, for maximum compression, a single edge should be formed, beginning from compacted array element 1691 and including compacted array element 1692. Step 1915 causes the compacted array element at 1692 to first look for a possible upward edge continuation. In this example, a possible upward edge continuation would be found in compacted array element 1691, and thus the edge formation down from compacted array element 1692 would be abandoned. This allows the edge creation beginning at compacted array element 1691 to form one complete edge.

Figure 21:
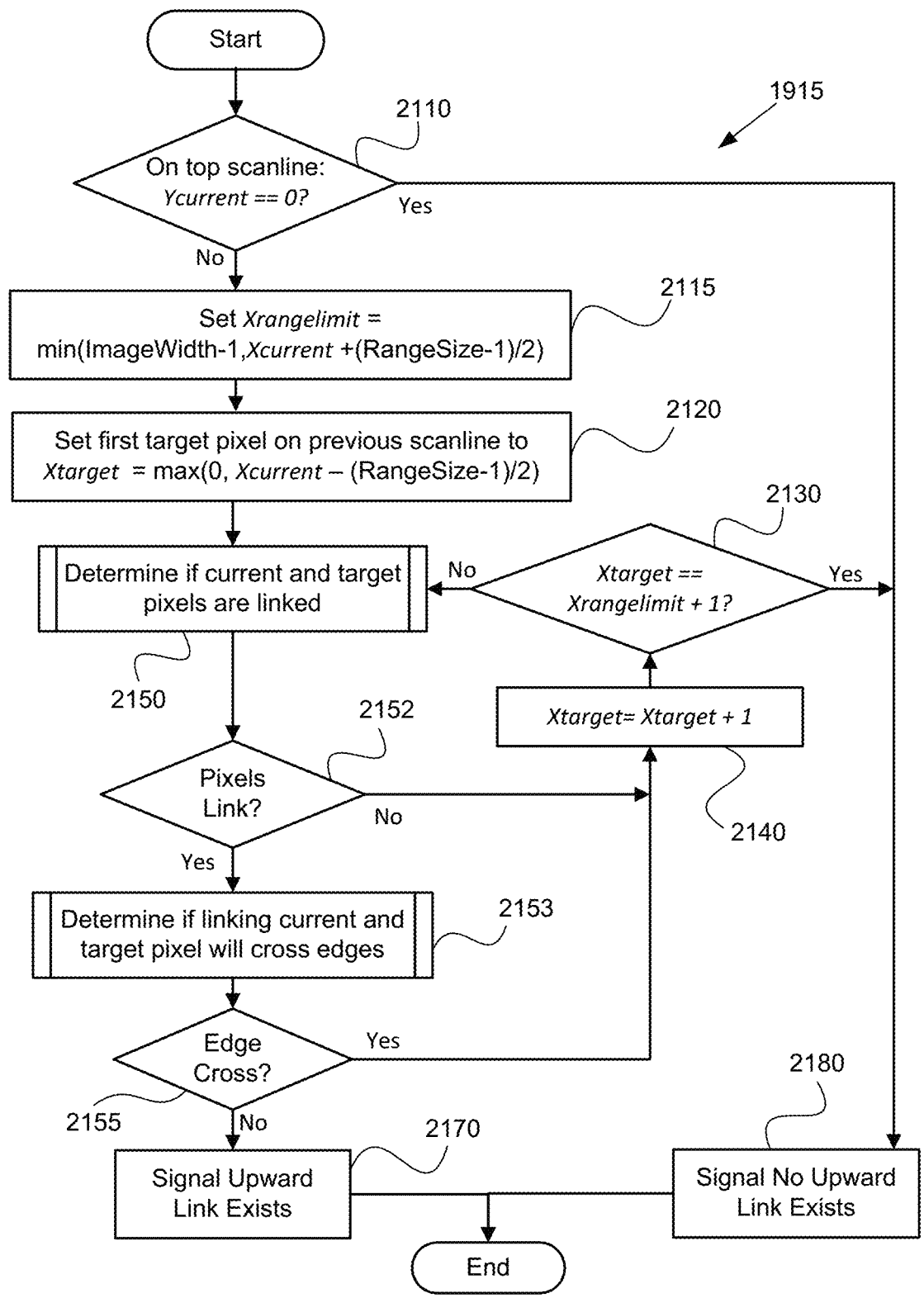
FIG. 21 is a schematic flow diagram showing a process of checking for upward edge linkage possibilities during edge creation during the first edge creation pass.
Figure 22:
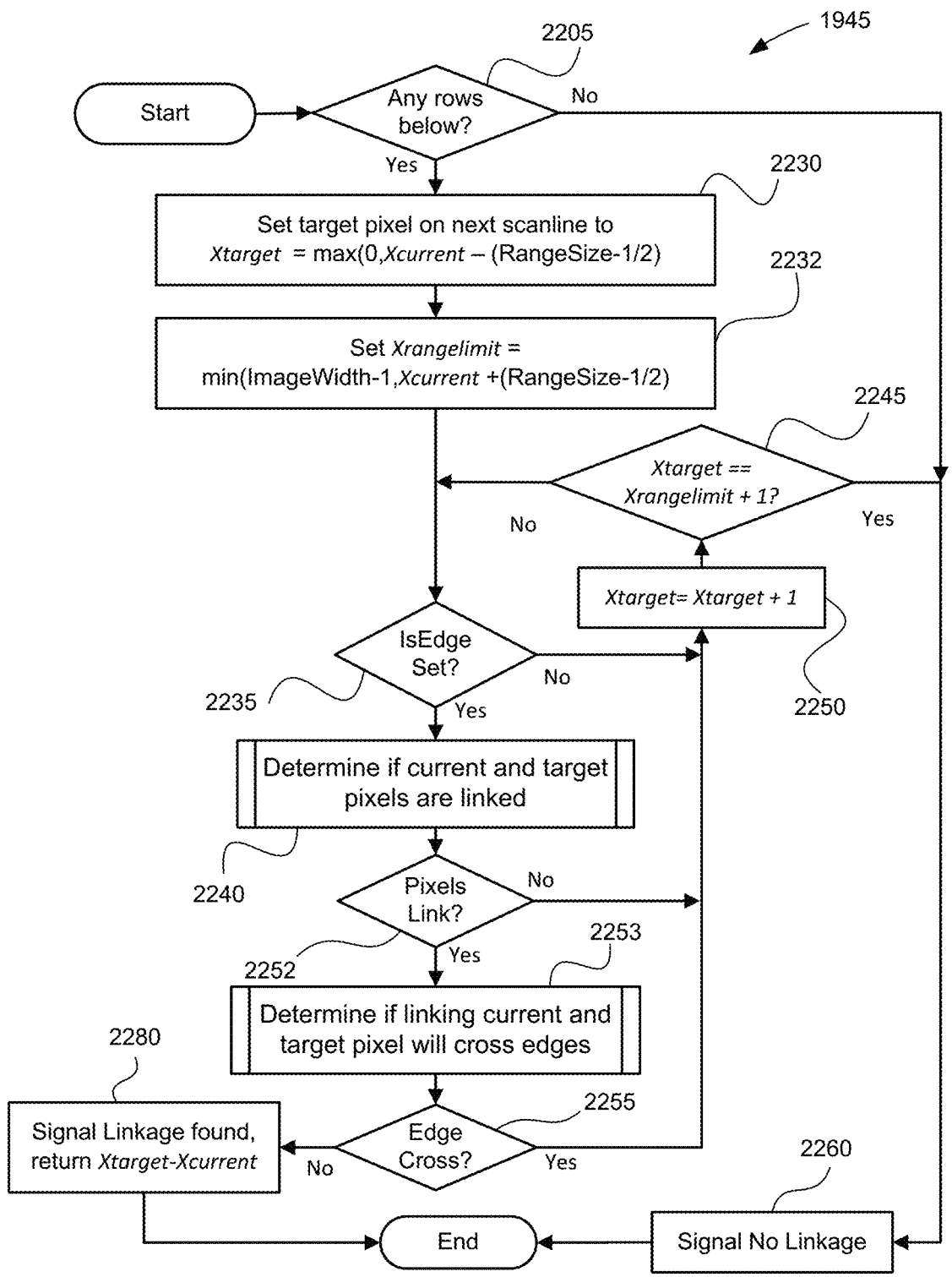
FIG. 22 is a schematic flow diagram showing a process of establishing the next pixel to be joined into an edge.
Figure 23:
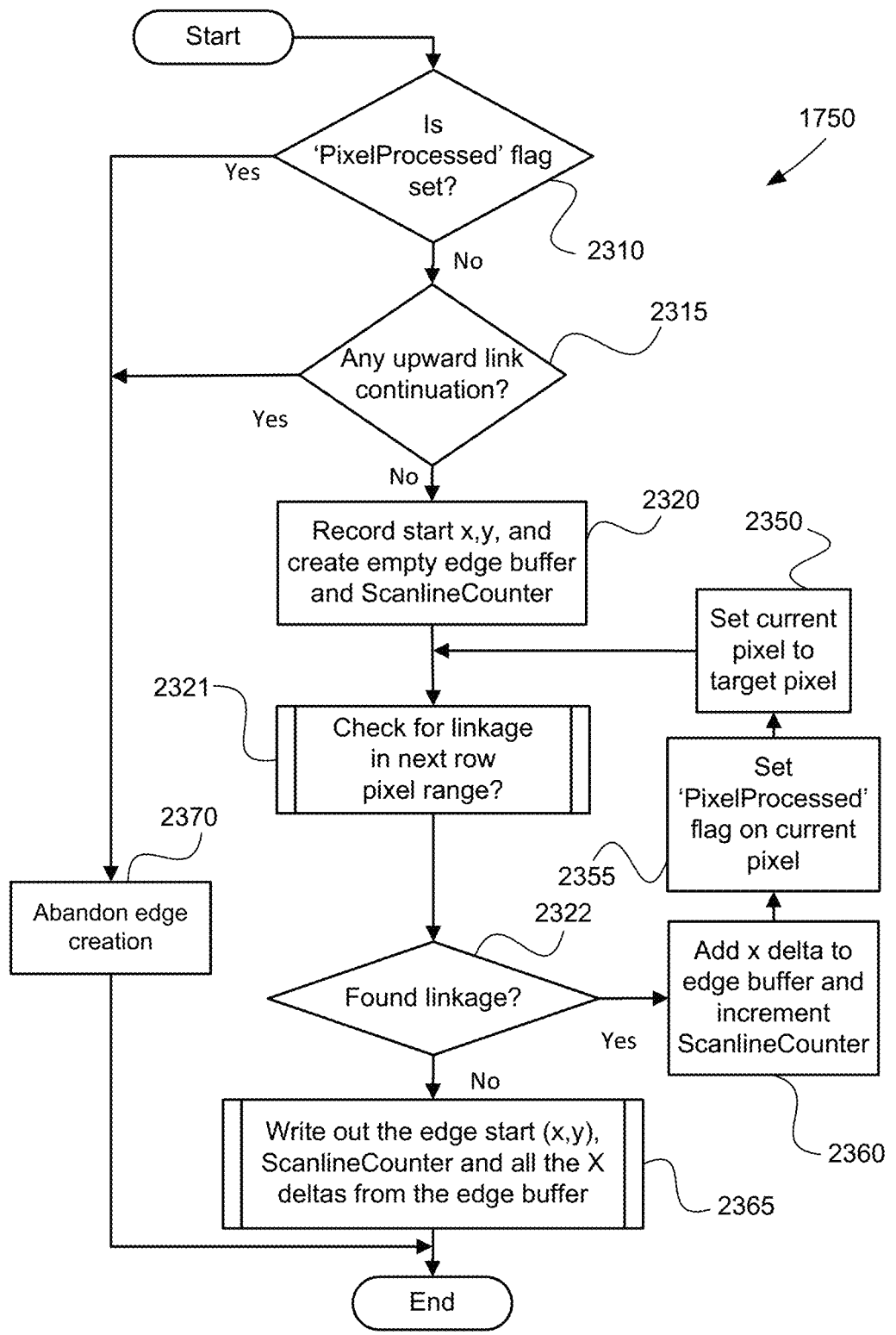
FIG. 23 is a schematic flow diagram illustrating a process of the second pass of creating individual edges from the compacted data structure.

FIG. 21 illustrates in detail this linking check routine 1915. In FIG. 21, processing commences at step 2110. At decision step 2110, a check is made on the top scanline if $Y_{current}$=0. This is done to see if there are any rows directly above (i.e. at the top of the image at $Y_{current}$=0). If step 2110 returns true (Yes), processing continues at step 2180, which signals no upward link exists. The current compacted array element cannot link to any compacted array element in the row above. Processing then ends. If step 2110 returns false (No), processing continues at step 2115. In step 2115, $X_{rangelimit}$ is set to min(ImageWidth-1, $X_{current}$+(Range-Size-1)/2). That is, if there are compacted array elements above, the target compacted array element with the largest x value to be checked is identified as $X_{rangelimit}$=min(ImageWidth-1, $X_{current}$+(RangeSize-1)/2). At step 2120, the first target pixel on the previous scanline $X_{target}$ is set to max(0, $X_{current}$-(RangeSize-1)/2). That is, the first target compacted array element in the scanline above is set to the compacted array element at $X_{target}$=max(0, $X_{current}$-(RangeSize-1)/2). At step 2150, a determination is made if the current and target pixels are linked. In this step, a check is made to see if the current compacted array element and the target compacted array element can be linked, as discussed hereinbefore with reference to FIG. 18. In decision step 2152, a check is made to determine if pixels are linked. If step 2152 returns true (Yes), establishing that these compacted array elements can be linked, processing continues at step 2153. Step 2153 determines if linking the current and target pixels crosses edges (i.e., check for a possible edge cross). Step 2153 is identical to step 1126, as explained hereinbefore in relation to FIG. 11.

In decision step 2155, a check is made if an edge is crossed, following step 2153. If step 2155 returns false (No), processing continues at step 2170. Step 2170 signals that an upward link exists. The current compacted array element is assumed to actually belong to an edge in the row above, and a link is signalled. Processing then ends. Referring again to step 2152, if step 2152 returns false (No), no linkage being found, processing continues at step 2140. In step 2140, the $X_{target}$ value is incremented. The next target compacted array element is selected by incrementing the $X_{target}$ value. Likewise, if decision step 2155 returns true (Yes), an edge crossing being detected, processing continues at step 2140. From step 2140, processing continues at decision step 2130. Step 2130 checks if the $X_{target}$ value is equal to $X_{rangelimit}$+1. This is done to ensure that the target compacted array element is within the desired range to be checked. Each target compacted array element in the range is likewise checked for linkage and cross check at steps 2152 and 2155, respectively. If step 2130 determines that the $X_{rangelimit}$ is reached (Yes), processing continues at step 2180. Step 2180 signals no upward link exists. No possible candidates are assumed to exist for upward edge linkage at step 2180. Processing then ends. If decision step 2130 returns false (No), processing continues at step 2150.

Referring again to FIG. 19, from step 1915, processing continues at step 1917. At step 1917, a check is made to determine if any candidates were found in step 1915. If decision step returns true (Yes), processing ends. That is, if any upwards links are found (such as, for example, for 1692 when 1691 is found) in step 1915, edge formation from this compacted array element is abandoned. Another process forms the edge that includes the current compacted array element, and that routine continues on to this compacted array element and any edge below the compacted array element.

Returning to FIG. 19, if step 1917 returns false (No), processing continues at step 1920. That is, step 1917 finds no upwards linkage candidates. Step 1920 records the start x, y position of the current pixel and creates an empty edge buffer and an empty ScanlineCounter. That is, step 1920 stores the current compacted array element's (x, y) point and sets up data storage for a buffer of edge data and a counter for the number of scanlines spanned by this edge. In step 1925, the PixelProcessed flag is set in the pixel data array entry for the current pixel, i.e., this compacted array element. At step 1945, a check is made for linkage in the next row pixel range. This is done on a range of horizontal compacted array elements in the row below the current compacted array element for possible edge link. This is further detailed in FIG. 22, as discussed hereinbefore. Processing then continues at step 1947.

In decision step 1947, a check is made to determine if any linkage has been found in step 1945. If step 1947 returns true (Yes), processing continues at step 1960. Thus, if step 1945 detects a valid edge link and returns the difference in x value between the linking compacted array elements, step 1960 adds x 'delta" to edge buffer and increments ScanlineCounter. Step 1960 records the difference in x values between the entries at the two compacted array elements in the edge buffer and increments the scanline counter. In step 1950, the current pixel is set to the target pixel. This target compacted array element becomes the current compacted array element. Processing continues at step 1925. Step 1945 again attempts to find a downward linking compacted array element for this new compacted array element. If step 1947 returns false (No), processing continues at step 1965. If step 1947 fails to find a compacted array element in the next row for linking (No), the edge is complete. Step 1965 writes out the edge start (x, y), ScanlineCounter, and all the X deltas from the edge buffer. This records the starting x & y values to output, together with the delta values as accumulated while linking compacted array elements on consecutive rows. Step 1965 is illustrated in detail in FIG. 20. Appropriate synchronisation is required to ensure that contending edge writes on different cores are handled safely. Processing commences at step 2010. Step 2010 writes out the edge start (x, y) values, together with a delimiter. This allows correct subsequent reading of the data. Step 2020 writes out the ScanlineCounter value with delimiter. In decision step 2050, a check is made if the ScanlineCounter is equal to zero (0). Step 2050 checks the scanline counter value. If step 2050 returns false (No), processing continues at step 2040. Step 2040 writes out the delta value of the next scanline with delimiter. Step 2030 decrements the ScanlineCounter. Processing continues at step 2050. At step 2050, once the counter reaches zero and decision step returns true (Yes), processing of the routine 1965 is Ends. Returning to FIG. 17A, routine 1740 ends upon completion of step 1965.

In FIG. 17A, step 1750 runs the second pass of the edge linking routine. This second pass links any edges that are broken by being beyond the range of the edge joining mechanism during the routine 1740 for linking edge pixels in the first pass.

FIGS. 17B(1) to 17B(3) illustrate the need for this second pass. In the example image 1760, pixels 1761, 1762, 1763 and 1765 are processed according to FIG. 11, and pixels 1762 and 1763 have their StartOfEdge entry set to true in the pixel data array 1770, at locations 1771 and 1772, respectively. However, the same process does not set pixels 1764 and 1765 as StartOfEdge, since the edges of pixels 1764 and 1765 continues above. The first-pass edge-forming routine 1740 begins edges at those compacted array elements marked StartOfEdge. Edge 1781 is formed from compacted array element 1771, and edge 1782 is formed from compacted array element 1772. Routine 1740 relies on proximity (as described in FIG. 22) to connect edges such as that between compacted array elements 1771 and 1773 into edge 1781. However, potentially joined compacted array elements 1774 and 1775 are spaced further than the Range value, and so no link can happen. To avoid omission of the edge beginning at 1775, the second pass routine 1750 picks up such 'orphan' edges like edge 1783.

This second pass edge read routine 1750 is closely related to the first-pass routine 1740. This time, start compacted array elements are only those without their PixelProcessed flags set, and without upward linkage options. This routine is shown in detail in FIG. 23. Processing commences at step 2310. In decision step 2310, a check is made to determine if the PixelProcessed flag is set. The current compacted array element's entry in the pixel data array is checked to determine if the current compacted array element is not flagged as PixelProcessed. If decision step 2310 returns true (Yes), processing continues at step 2370. In step 2370, edge creation is abandoned and processing ends without linking edges. If decision step 2310 returns false (No), processing continues at step 2315. In decision step 2315, a check is made to determine if the current compacted array element has an upward link continuation. Step 2315 checks if there are any edge fragments on the scanline above that do not have their PixelProcessed flag set and may link with this compacted array element. If step 2315 returns true (Yes), processing continues at step 2370. Again, routine 1750 ends without linking edges. In step 2315, if any such edge fragments are found, the edge fragments can be linked with this compacted array element's edge, so at step 2370 the edge starting from this compacted array element can be safely abandoned. Otherwise, if step 2315 returns false (No), processing continues at step 2320.

Figure 24:
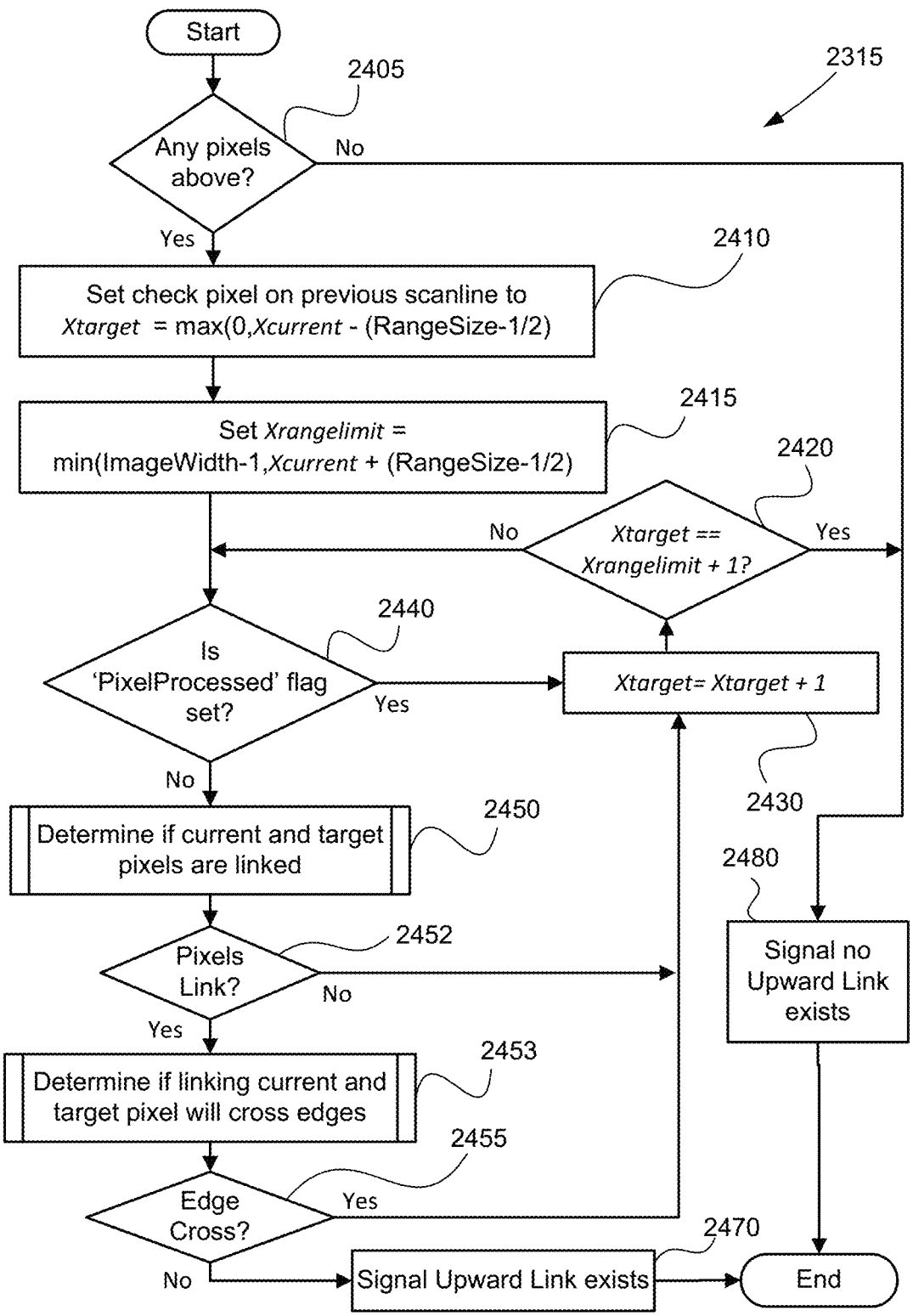
FIG. 24 is a schematic flow diagram showing a process of checking for upward edge linkage possibilities during edge creation during the second edge creation pass.

FIG. 24 illustrates in greater detail step 2315. Processing commences at step 2405. In step 2405, a check is made if there are any pixels above. This is done to determine if any compacted array elements are in the row directly above (i.e. at the top of the image). If step 2405 returns false (No), processing continues at step 2480 signalling that no upward link exists, i.e., there is no edge link possible to the row above. Processing of routine 2315 then ends. However, if step 2405 returns true (Yes), meaning there are compacted array elements above, processing continues at step 2410. At step 2410, the pixel being checked for continuation on the previous scanline is set to $X_{target}$=max(0, $X_{current}$−(RangeSize−1)/2). Thus, the first target compacted array element location in the scanline above is set at $X_{target}$=max(0, $X_{current}$−(RangeSize−1)/2). In step 2415, the $X_{rangelimit}$ is set to min(ImageWidth−1, $X_{current}$+(RangeSize−1)/2). Step 2415 establishes the highest target x value to be checked, as $X_{rangelimit}$=min(ImageWidth−1, $X_{current}$+(RangeSize−1)/2). Processing continues at step 2440.

In decision step 2440, a check is made to determine if the PixelProcessed flag is set. This determines if the target compacted array element does not have PixelProcessed set. If step 2440 returns true (Yes), processing continues at step 2430, where $X_{target}$=$X_{target}$+1. The next target compacted array element is selected thereby by incrementing the x value. In decision step 2420, a check is made if $X_{target}$ is equal to $X_{rangelimit}$+1. If step 2420 returns true (Yes), processing continues at step 2480. Otherwise, if step 2420 returns false (No), processing returns to step 2440. If decision step 2440 returns false (No), processing continues at step 2450.

Step 2450 determines if the current and target pixels (compacted array elements) are linked. Step 2450 is identical to step 2150, as explained hereinbefore in relation to FIG. 8. Processing continues at step 2452. In decision step 2452, a check is made if the pixels are linked. If at step 2452 returns false (No) meaning no linkage is possible, processing continues at step 2430, where again the next target compacted array element is selected by incrementing the x value. Otherwise, if decision step 2452 returns true (Yes), processing continues at step 2453. In step 2453, a determination is made if linking current and target pixels crosses edges. This is done to establish whether a link between current and target compacted array elements violates edge crossing rules. Step 2453 is identical to step 1126, as explained hereinbefore in relation to FIG. 11. Processing continues at step 2455. In decision step 2455, a check is made if an edge is crossed. If step 2455 returns true (Yes) meaning an edge cross is detected, processing continues at step 2430, where the next target compacted array element is selected by incrementing the x value. Once the x value of the next target compacted array element is determined, at step 2420, the value is checked to ensure the value is within the $X_{rangelimit}$, as established in 2415. If value is not at step 2420, no target compacted array elements in the range link with the current compacted array element, and processing continues at step 2480, which registers that no link exists from the current compacted array element to the row beneath. However, if step 2455 returns false (No), processing continues at step 2470. Step 2470 signals no upward link exists. Thus, if a target compacted array element is found that has PixelProcessed set (step 2440), satisfies linkage criteria (step 2452), and has no edge crossing issues (step 2455), step 2470 signals an upward link. Processing then ends.

Returning to FIG. 23, step 2320 records the start pixel x, y values and creates an empty edge buffer and ScanlineCounter. Thus, if there is no confirmed upper link (at step 2315), step 2320 initialises edge buffer storage and records the start compacted array element (x, y) and the counter of the scanlines spanned by this edge. Step (routine) 2321 checks for linkage in the next row's pixel range. This checks on a range of horizontal compacted array elements in the row below the current compacted array element to determine if an edge link is possible. Step 2321 is identical to step 2150, as explained hereinbefore in relation to FIG. 18.

From step 2321, processing continues at step 2322. In step 2322, a check is made if a linkage is found. If step 2322 returns true (Yes), meaning a valid edge linkage is detected (returning the difference in x values between the current compacted array element and the linked target compacted array element), processing continues at step 2360. In step 2360, the X delta is added to the edge buffer and the ScanlineCounter is incremented. Step 2360 records the difference in x values and increments the scanline counter. In step 2355, the PixelProcessed flag of the current pixel is set. The corresponding pixel data array entry gets its PixelProcessed flag set. In step 2350, the current pixel is set to the target pixel. The target compacted array element becomes the current compacted array element. Processing then continues at step 2321. If step 2322 returns false (No) meaning no valid linkage compacted array element is found, processing continues at step 2365. That is, the edge is finished at this compacted array element. In step 2365, the edge's start x and y values and all the deltas from the edge buffer is written out. Step 2365 records the starting x & y values to the output, together with the various delta values as accumulated, while linking compacted array elements on consecutive scanlines. Processing in routine 1750 then ends.

Figures 25A, 25B:
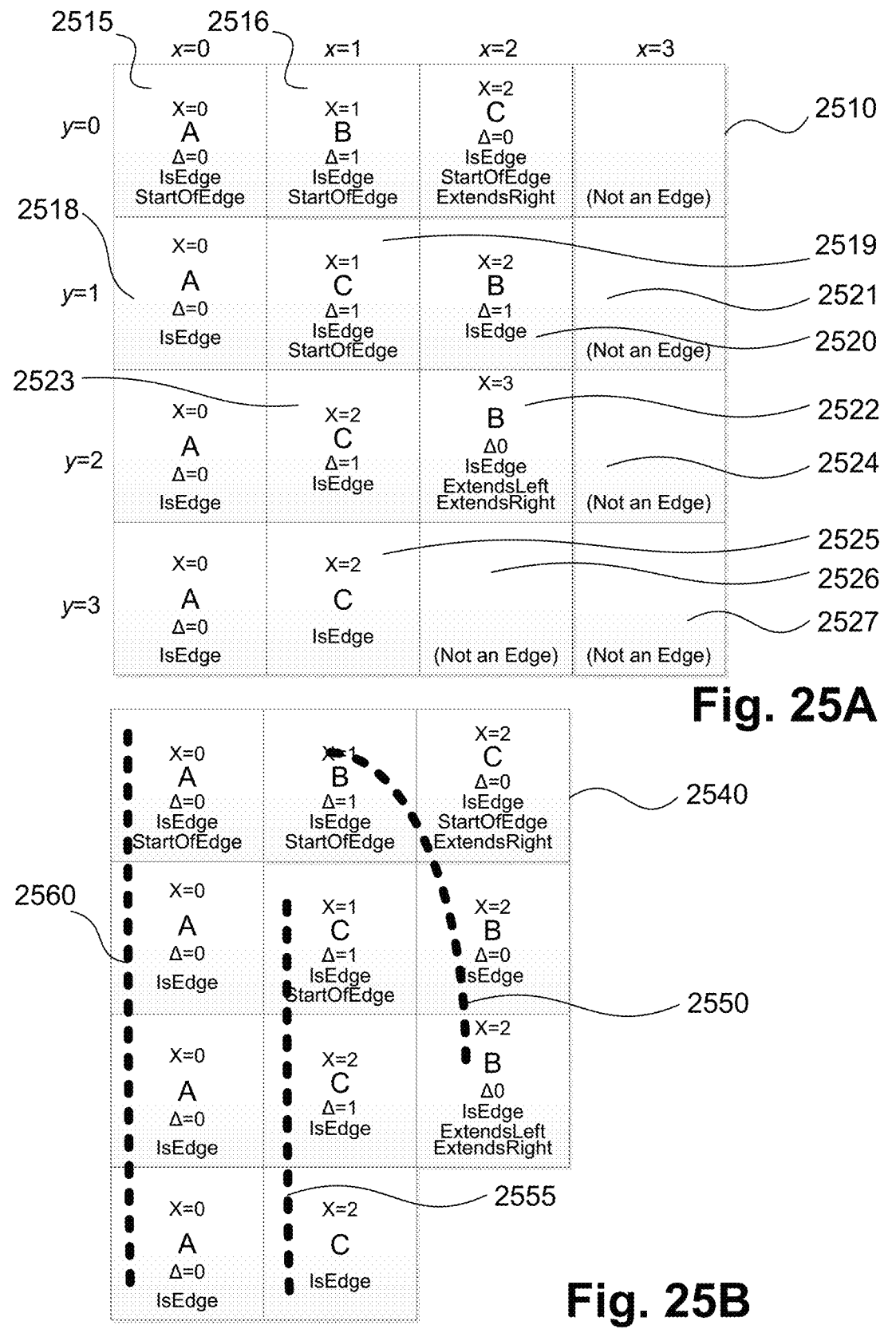

FIGS. 25A and 25B depict a worked example of edge creation, starting from a compacted array of pixel data. The compacted pixel data array 2510 follows on from the earlier example in FIG. 14. The edge reading beginning at the pixel data array entry 2516 is described.

The first pass 1740 of edge linking begins. As discussed above, this routine is run as a GPU kernel, with an instance running on a GPU thread for each and every element in the pixel data array.

Beginning from routine 1740, as described in FIG. 19, step 1910 first determines that compacted array element 2516 is indeed a start of edge compacted array element. Step 1915 checks for any edge links to compacted array elements in the row above the current compacted array element 2516. This is shown in FIG. 21. However, step 2110 of process 1915 establishes that the compacted array element 2516 is on the top scanline of the image, and so step 1917 determines that no upward candidate compacted array elements exist.

Step 1920 records this start compacted array element location as (1,0) 2516 and readies an output buffer and scanline counter. In step 1925 the PixelProcessed flag is set in the pixel data array for this compacted array element 2516. Step 1945 looks for an edge linkage down to the next row. Expanding step 1945 in FIG. 22, step 2205 checks and finds a rows below the current compacted array element 2516.

Step 2230 sets the first in a range of target compacted array elements, starting at $X_{current}-(RangeSize/2)=1-3/2=0$, i.e. the compacted array element at (0,1) 2518. Step 2232 sets the range limit at min(ImageWidth−1, $X_{current}$+(RangeSize−1/2)=min(3,1+2/2)=2. Step 2235 confirms that IsEdge is set for the target compacted array element 2518. At step 2240, the current compacted array element 2516 and the target compacted array element 2518 are determined to have different colours (same step as 1810). Step 2250 increments the $X_{target}$ by one, i.e. to the compacted array element at (2,1) 2519. Step 2235 confirms that IsEdge is set for the target compacted array element 2519. At step 2240 (per step 1810) the current compacted array element 2516 and the target compacted array element 2519 are determined to have different colours. Step 2250 increments the $X_{target}$ by one, i.e. to the compacted array element at (2,1) 2520. Step 2235 confirms that IsEdge is set for the target compacted array element 2520.

At step 2240 (per step 1810), the current compacted array element 2516 and the target compacted array element 2520 are determined to have the same colour, and the Delta value (in step 1860) is determined to be correct, so linking is possible (step 2252). Step 2253 checks for a crossed edge across this possible link between current compacted array element 2516 and target compacted array element 2520. Moving to FIG. 8 for this check, step 810 sets the top range of check compacted array elements to be just the compacted array element 2515. Step 815 confirms that compacted array element to be in range, and step 820 sets the bottom range as just compacted array element 2521. Step 830 confirms that compacted array element to be in range, but step 831 finds the lower compacted array element 2521 to not have IsEdge set. Steps 830 and 815 confirm that both top and bottom ranges are exhausted, and so the routine confirms at step 845 that there are no crosses for this link. With step 2255 determining no edge crossing, step 2280 signals that there is a compacted array element link between the current compacted array element 2516 and the target compacted array element 2520, returning to FIG. 19 with the difference in x between current and target compacted array elements=1. In step 1960, the delta (=1) is added to the edge buffer, and the scanline counter is incremented by 1. Finally, in step 1950, the target compacted array element 2520 becomes the current compacted array element. The loop continues with this new compacted array element to step 1945 to determine if this edge extends to the scanline below the new current compacted array element 2520.

With the new current compacted array element set as compacted array element 2520, step 1945 looks for an edge link down to the next row. Step 1945 is shown in detail in FIG. 22, where step 2205 checks and finds rows below. Step 2230 sets the first in a range of target compacted array elements, starting at $X_{current}-(RangeSize/2)=2-3/2=1$, i.e. the compacted array element at (1,1) 2523. Step 2232 sets the range limit at min(ImageWidth−1, $X_{current}$+(RangeSize−1/2)=min(3,2+2/2)=3. Step 2235 confirms that IsEdge is set for the target compacted array element 2523. At step 2240 (per step 1810) the current compacted array element 2520 and the target compacted array element 2523 are determined to have different colours. Step 2250 increments the $X_{target}$ by one, i.e. to the compacted array element at (2,2) 2522. Step 2235 confirms that IsEdge is set for the target compacted array element 2522. At step 2240 (per step 1810) the current compacted array element 2520 and the target compacted array element 2522 are determined to have the same colour, and the Delta value (in step 1860) is correct, so linking is possible (step 2252).

Step 2153 checks for a crossed edge across this proposed link between current compacted array element 2520 and target compacted array element 2522. Moving to FIG. 8 for this check, step 810 sets the top range of check compacted array elements to be just the compacted array element 2519. Step 815 confirms that compacted array element to be in range, and step 820 sets the bottom range as just compacted array element 2524. Step 830 confirms that compacted array element to be in range, however step 832 finds that bottom compacted array element is not an edge. Steps 830 and 815 confirm that both top and bottom ranges are exhausted, and so the routine confirms at step 845 that there are no crosses for this link. Step 2280 signals that there is a compacted array element link between the current compacted array element 2520 and the target compacted array element 2522, returning to FIG. 19 with the difference in x between current and target compacted array elements=0. In step 1960, the delta (=1) is added to the edge buffer, and the scanline counter is incremented to 1. Finally, in step 1950, the target compacted array element 2522 becomes the current compacted array element. The loop continues with this new compacted array element to step 1945 to determine if this edge extends to the scanline below the new current compacted array element 2522.

With the new current compacted array element set as compacted array element 2522, step 1945 looks for an edge link down to the next row. Expanding step 1945 in FIG. 22, step 1905 checks and finds rows below. Step 2230 sets the first in a range of target compacted array elements, starting at $X_{current}-(RangeSize/2)=2-3/2=1$, i.e. the compacted array element at (1,3) 2525. Step 2232 sets the range limit at min(ImageWidth−1, $X_{current}$+(RangeSize−1/2)=min(3,2+2/2)=3. Step 2235 confirms that IsEdge is set for the target compacted array element 2525. At step 2240 (per step 1810) the current compacted array element 2522 and the target compacted array element 2525 are determined to have different colours. Step 2250 increments the $X_{target}$ by one, i.e. to the compacted array element at (2,3) 2526. Step 2235 determines that IsEdge is not set for the target compacted array element 2526. Step 2250 increments the $X_{target}$ by one, i.e. to the compacted array element at (3,3) 2527. Step 2235 determines that IsEdge is not set for the target compacted array element 2526. Step 2250 increments the $X_{target}$ by one, to 4. Step 2245 is satisfied (since $X_{target}$ of $4=X_{rangelimit}$ (3)+1). Step 2260 signals no linkage between the current compacted array element 2522 and any compacted array element in the row beneath.

Figure 20:
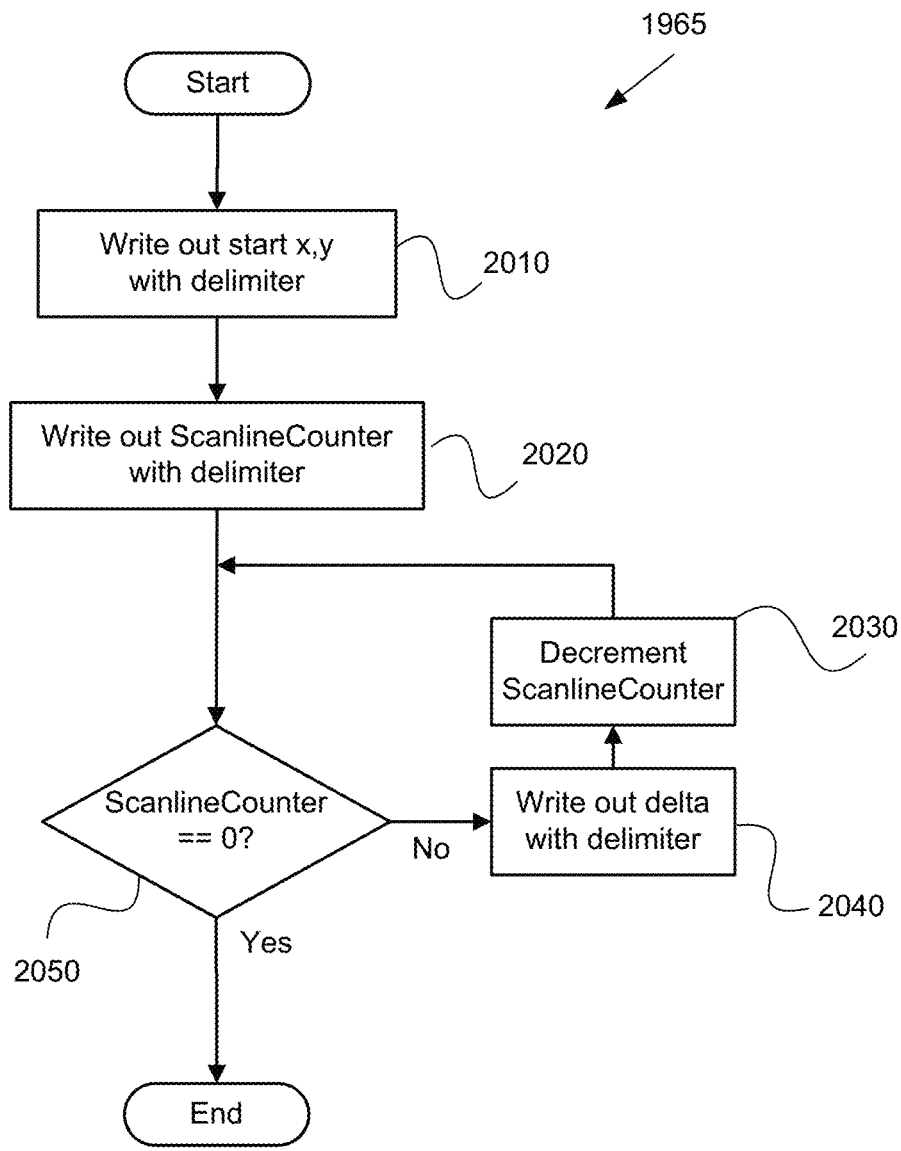
FIG. 20 is a schematic flow diagram illustrating a process of writing out edge data.

Returning to FIG. 19, step 1965 writes out the now complete edge to the output storage, as per FIG. 20.

The compacted array element data array example in 2540 shows the newly created edge 2550 superimposed. Other edges 2560 and 2555 are also created in a similar manner and written to storage.

Returning to FIG. 17A, step 1750 executes on all compacted array elements. However, in this simple example, PixelProcessed has been set on all compacted array elements during step 1740. So, step 1750, expanding into FIG. 23, immediately ends at step 2310 for all compacted array elements.

At this point the routine is complete, and a set of compressed edges has been generated from the original image.

The embodiments of the invention are applicable to the computer and data processing industries. The foregoing describes only a small number of methods, apparatuses, and computer readable media for image compression in accordance with embodiments of the invention, and modifications and/or changes can be made thereto without departing from the scope and spirit of the invention, the embodiments being illustrative and not restrictive.

I claim:

1. A computer-implemented method of image compression, the method comprising:
   establishing, using a processor, a plurality of edge elements of an image comprising a plurality of pixels by analysing pixel values associated with the pixels of the image, the plurality of edge elements being organised in an edge data structure having at least two dimensions;
   compacting, using the processor, the edge data structure along a first dimension by arranging the established edge elements adjacent to each other along the first dimension in a compacted edge data structure;
   determining, using the processor, edge elements to be joined along a second dimension in the compacted edge data structure based on pixel values of neighbouring edge elements, along the second dimension, in the compacted edge data structure; and
   compressing, using the processor, the image by encoding edges formed by joining the determined edge elements.

2. The computer-implemented method as claimed in claim 1, wherein the image compression is implemented using a plurality of pixel threads, each thread from the pixel threads being assigned to process at least one pixel of the image data.

3. The computer-implemented method as claimed in claim 2, wherein the establishing step comprises concurrently analysing pixel values associated with the pixels of the image using the assigned pixel threads.

4. The computer-implemented method as claimed in claim 1, wherein the compacting step is implemented using a plurality of compacting threads assigned to each scanline in the edge data structure.

5. The computer-implemented method as claimed in claim 1, wherein two edges are joined concurrently by separate edge threads.

6. The computer-implemented method as claimed in claim 1, wherein the edges are formed by joining the determined edge elements lying within a predetermined number of edge elements in the compacted edge data structure, the joining step comprising comparing, by an edge thread, the pixel value of a current edge element with at least one edge element in the subsequent scanline lying within a predetermined number of edge elements in the compacted edge data structure.

7. The computer-implemented method as claimed in claim 6, wherein the joining step comprises selecting an edge element in the subsequent scanline to be joined with the current edge element in accordance with the direction of continuation associated with the current edge element.

8. The computer-implemented method as claimed in claim 1, wherein the establishing step comprises comparing a pixel value of a current pixel with a pixel value of at least one other pixel in the same scanline.

9. The computer-implemented method as claimed in claim 1, wherein each edge element comprises:
   an edge element status (start, end),
   a possible direction of continuation of an edge associated with the edge element,
   a pixel value of the edge element, and
   a position in the image of the edge element.

10. The computer-implemented method as claimed in claim 1, comprising compacting the established edge pixel data using a plurality of compacting threads for a scanline in a pixel data array to form a compacted pixel data array.

11. The computer-implemented method as claimed in claim 1, wherein the edge elements are established by analysing colour values of pixels.

12. The computer-implemented method as claimed in claim 11, wherein an edge is formed by joining like-coloured determined edge elements.

13. The computer-implemented method as claimed in claim 11, comprising storing the determined compressed edges in storage device.

14. The computer-implemented method as claimed in claim 1, wherein the compression is lossless.

15. The computer-implemented method as claimed in claim 1, wherein the processor comprises a plurality of processing units executing a plurality of threads in implementing the image compression, at least two threads executing in at least two processing units in parallel.

16. The computer-implemented method as claimed in claim 1, wherein the processor comprises a graphics processing unit (GPU).

17. An apparatus comprising a processor and memory coupled to the processor, the memory storing a program executable by the processor to compress an image, the program comprising:
   code to establish a plurality of edge elements of an image comprising a plurality of pixels by analysing pixel values associated with the pixels of the image, the plurality of edge elements being organised in an edge data structure having at least two dimensions;
   code to compact the edge data structure along a first dimension by arranging the established edge elements adjacent to each other along the first dimension in a compacted edge data structure; and
   code to determine compressed edges in a second dimension in the compacted edge data structure by:
      determining edge elements to be joined along a second dimension in the compacted edge data structure based on pixel values of neighbouring edge elements, along the second dimension, in the compacted edge data structure; and
      compressing the image by encoding formed edges, the edges being formed by joining the determined edge elements.

18. A non-transitory computer readable storage medium having recorded therein a computer program, the program being executable by a processor to compress an image, the program comprising:
- code to establish a plurality of edge elements of an image comprising a plurality of pixels by analysing pixel values associated with the pixels of the image, the plurality of edge elements being organised in an edge data structure having at least two dimensions;
- code to compact the edge data structure along a first dimension by arranging the established edge elements adjacent to each other along the first dimension in a compacted edge data structure; and
- code to determine compressed edges in a second dimension in the compacted edge data structure by:
  - determining edge elements to be joined along a second dimension in the compacted edge data structure based on pixel values of neighbouring edge elements, along the second dimension, in the compacted edge data structure; and
  - compressing the image by encoding formed edges, the edges being formed by joining the determined edge elements.

19. A computer-implemented method of image compression, the method comprising:
- establishing, using a processor, a plurality of edge elements of an image comprising a plurality of pixels, the plurality of edge elements being organised in an edge data structure;
- compacting, using the processor, the edge data structure by arranging the established edge elements adjacent to each other in a compacted edge data structure, the compacted edge data structure being stored in a memory associated with the processor;
- determining, using the processor and the memory, edge elements to be joined across a plurality of scanlines of the image based on pixel value and position of edge elements in the compacted edge data structure; and
- compressing, using the processor, the image by encoding edges formed by joining the determined edge elements.

20. The computer-implemented method as claimed in claim 19, wherein the processor comprises a graphics processing unit (GPU).

* * * * *